(12) United States Patent
Laroia

(10) Patent No.: US 9,374,514 B2
(45) Date of Patent: Jun. 21, 2016

(54) METHODS AND APPARATUS RELATING TO A CAMERA INCLUDING MULTIPLE OPTICAL CHAINS

(71) Applicant: THE LIGHTCO INC., Palo Alto, CA (US)

(72) Inventor: Rajiv Laroia, Far Hills, NJ (US)

(73) Assignee: THE LIGHTCO INC., Palo Alto, CA (US)

( * ) Notice: Subject to any disclaimer, the term of this patent is extended or adjusted under 35 U.S.C. 154(b) by 0 days.

(21) Appl. No.: 14/516,568

(22) Filed: Oct. 16, 2014

(65) Prior Publication Data

US 2015/0138423 A1    May 21, 2015

Related U.S. Application Data

(63) Continuation-in-part of application No. 14/327,510, filed on Jul. 9, 2014, and a continuation-in-part of application No. 14/327,512, filed on Jul. 9, 2014, and a continuation-in-part of application No. 14/327,514, (Continued)

(51) Int. Cl.
*H04N 5/225* (2006.01)
*G02B 13/00* (2006.01)
*G02B 17/00* (2006.01)
(Continued)

(52) U.S. Cl.
CPC .......... *H04N 5/2254* (2013.01); *G02B 13/0065* (2013.01); *G02B 17/008* (2013.01); *G02B 17/08* (2013.01); *H04N 5/2258* (2013.01); *H04N 5/23212* (2013.01); *H04N 5/23232* (2013.01); *H04N 5/23258* (2013.01); *H04N 5/23287* (2013.01); *H04N 5/28* (2013.01)

(58) Field of Classification Search
None
See application file for complete search history.

(56) References Cited

U.S. PATENT DOCUMENTS

| 5,078,479 A | 1/1992 | Vuilleumier |
| 5,353,068 A | 10/1994 | Moriwake |

(Continued)

FOREIGN PATENT DOCUMENTS

| EP | 2642757 A2 | 9/2013 |
| JP | 10091765 | 4/1998 |

(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

(Continued)

*Primary Examiner* — Twyler Haskins
*Assistant Examiner* — Angel L Garces-Rivera
(74) *Attorney, Agent, or Firm* — Michael P. Straub; Robert P. Straub; Abbas Zaidi

(57) ABSTRACT

Camera methods and apparatus are described where the camera device includes multiple optical chains. In various embodiments two or more of the optical chains include light redirection devices such as mirrors or prisms. Sensors corresponding to multiple different optical chains, but not necessarily all optical chains, are parallel to each other. In some embodiments sensors corresponding to different optical chains are located in the same plane at the front or rear of the camera. However other sensor mounting positions are also possible.

12 Claims, 22 Drawing Sheets

Related U.S. Application Data filed on Jul. 9, 2014, and a continuation-in-part of application No. 14/327,515, filed on Jul. 9, 2014, and a continuation-in-part of application No. 14/327,517, filed on Jul. 9, 2014, and a continuation-in-part of application No. 14/327,518, filed on Jul. 9, 2014, and a continuation-in-part of application No. 14/327,492, filed on Jul. 9, 2014, and a continuation-in-part of application No. 14/327,524, filed on Jul. 9, 2014, and a continuation-in-part of application No. 14/327,525, filed on Jul. 9, 2014, now Pat. No. 9,197,816, and a continuation-in-part of application No. 14/327,508, filed on Jul. 9, 2014.

(60) Provisional application No. 61/978,818, filed on Apr. 11, 2014, provisional application No. 61/981,849, filed on Apr. 20, 2014, provisional application No. 62/021,094, filed on Jul. 4, 2014, provisional application No. 61/893,100, filed on Oct. 18, 2013, provisional application No. 61/896,069, filed on Oct. 26, 2013, provisional application No. 61/899,097, filed on Nov. 1, 2013, provisional application No. 61/922,801, filed on Dec. 31, 2013, provisional application No. 61/943,299, filed on Feb. 21, 2014, provisional application No. 61/943,302, filed on Feb. 21, 2014.

(51) Int. Cl.
*G02B 17/08* (2006.01)
*H04N 5/28* (2006.01)
*H04N 5/232* (2006.01)

(56) References Cited

U.S. PATENT DOCUMENTS

| | | | |
|---|---|---|---|
| 5,781,331 | A | 7/1998 | Carr et al. |
| 5,889,553 | A | 3/1999 | Kino et al. |
| 5,975,710 | A | 11/1999 | Luster |
| 5,982,951 | A | 11/1999 | Katayama et al. |
| 6,081,670 | A | 6/2000 | Madsen et al. |
| 7,009,652 | B1 | 3/2006 | Tanida et al. |
| 7,280,735 | B2 | 10/2007 | Thibault |
| 7,315,423 | B2 | 1/2008 | Sato |
| 7,551,358 | B2 | 6/2009 | Lee et al. |
| 7,561,201 | B2 | 7/2009 | Hong |
| 7,810,511 | B2 | 10/2010 | Fagrenius et al. |
| 8,144,230 | B2 | 3/2012 | Watanabe et al. |
| 8,194,169 | B2 | 6/2012 | Tamaki et al. |
| 8,199,222 | B2 | 6/2012 | Drimbarean et al. |
| 8,237,841 | B2 | 8/2012 | Tanida et al. |
| 8,320,051 | B2 | 11/2012 | Matsumura et al. |
| 8,482,637 | B2 | 7/2013 | Ohara et al. |
| 8,520,022 | B1 | 8/2013 | Cohen et al. |
| 8,553,106 | B2 | 10/2013 | Scarff |
| 8,639,296 | B2 | 1/2014 | Ahn et al. |
| 8,704,944 | B1 | 4/2014 | Wierzoch et al. |
| 8,780,258 | B2 | 7/2014 | Lee |
| 2003/0020814 | A1 | 1/2003 | Ono |
| 2003/0185551 | A1 | 10/2003 | Chen |
| 2004/0227839 | A1 | 11/2004 | Stavely et al. |
| 2006/0067672 | A1 | 3/2006 | Washisu et al. |
| 2006/0187338 | A1 | 8/2006 | May et al. |
| 2006/0221218 | A1 | 10/2006 | Adler et al. |
| 2006/0238886 | A1 | 10/2006 | Kushida et al. |
| 2007/0050139 | A1 | 3/2007 | Sidman |
| 2007/0177047 | A1 | 8/2007 | Goto |
| 2007/0182528 | A1 | 8/2007 | Breed et al. |
| 2008/0030592 | A1 | 2/2008 | Border et al. |
| 2008/0074755 | A1 | 3/2008 | Smith |
| 2008/0084484 | A1 | 4/2008 | Ochi et al. |
| 2008/0211941 | A1 | 9/2008 | Deever et al. |
| 2008/0219654 | A1 | 9/2008 | Border et al. |
| 2008/0247745 | A1 | 10/2008 | Nilsson |
| 2008/0251697 | A1 | 10/2008 | Park et al. |
| 2008/0278610 | A1 | 11/2008 | Boettiger |
| 2009/0086032 | A1 | 4/2009 | Li |
| 2009/0154821 | A1 | 6/2009 | Sorek et al. |
| 2009/0225203 | A1 | 9/2009 | Tanida et al. |
| 2009/0278950 | A1 | 11/2009 | Deng et al. |
| 2010/0013906 | A1 | 1/2010 | Border et al. |
| 2010/0053414 | A1 | 3/2010 | Tamaki et al. |
| 2010/0097443 | A1* | 4/2010 | Lablans ............ 348/36 |
| 2010/0225755 | A1 | 9/2010 | Tamaki et al. |
| 2010/0238327 | A1 | 9/2010 | Griffith et al. |
| 2010/0265346 | A1 | 10/2010 | Iizuka |
| 2010/0283842 | A1 | 11/2010 | Guissin et al. |
| 2010/0296802 | A1 | 11/2010 | Davies |
| 2011/0051243 | A1 | 3/2011 | Su |
| 2011/0063325 | A1 | 3/2011 | Saunders |
| 2011/0069189 | A1 | 3/2011 | Venkataraman et al. |
| 2011/0080655 | A1 | 4/2011 | Mori |
| 2011/0128393 | A1 | 6/2011 | Tavi et al. |
| 2011/0157430 | A1 | 6/2011 | Hosoya et al. |
| 2011/0157451 | A1 | 6/2011 | Chang |
| 2011/0187878 | A1 | 8/2011 | Mor et al. |
| 2011/0222167 | A1 | 9/2011 | Iwasawa |
| 2011/0242342 | A1 | 10/2011 | Goma et al. |
| 2011/0280565 | A1 | 11/2011 | Chapman et al. |
| 2011/0285895 | A1 | 11/2011 | Weng et al. |
| 2012/0002096 | A1 | 1/2012 | Choi et al. |
| 2012/0033069 | A1 | 2/2012 | Becker et al. |
| 2012/0147196 | A1* | 6/2012 | Lin ............ G02B 5/08 348/187 |
| 2012/0155848 | A1 | 6/2012 | Labowicz et al. |
| 2012/0162464 | A1 | 6/2012 | Kim |
| 2012/0242881 | A1 | 9/2012 | Suzuki |
| 2012/0249815 | A1 | 10/2012 | Bohn et al. |
| 2012/0257013 | A1 | 10/2012 | Witt et al. |
| 2012/0257077 | A1 | 10/2012 | Suzuki |
| 2012/0268642 | A1* | 10/2012 | Kawai ............ 348/335 |
| 2013/0027353 | A1 | 1/2013 | Hyun |
| 2013/0050564 | A1 | 2/2013 | Adams, Jr. et al. |
| 2013/0057743 | A1 | 3/2013 | Minagawa et al. |
| 2013/0064531 | A1 | 3/2013 | Pillman et al. |
| 2013/0076928 | A1 | 3/2013 | Olsen et al. |
| 2013/0086765 | A1 | 4/2013 | Chen |
| 2013/0093842 | A1 | 4/2013 | Yahata |
| 2013/0100272 | A1 | 4/2013 | Price et al. |
| 2013/0153772 | A1 | 6/2013 | Rossi et al. |
| 2013/0155194 | A1 | 6/2013 | Sacre et al. |
| 2013/0194475 | A1 | 8/2013 | Okamoto |
| 2013/0222676 | A1 | 8/2013 | Ono |
| 2013/0223759 | A1 | 8/2013 | Nishiyama |
| 2013/0258044 | A1 | 10/2013 | Betts-Lacroix |
| 2014/0111650 | A1* | 4/2014 | Georgiev et al. ............ 348/159 |
| 2014/0204244 | A1 | 7/2014 | Choi et al. |
| 2014/0354714 | A1 | 12/2014 | Hirschler et al. |
| 2015/0156399 | A1 | 6/2015 | Chen et al. |
| 2015/0234149 | A1 | 8/2015 | Kreitzer et al. |
| 2015/0253647 | A1 | 9/2015 | Mercado |
| 2015/0279012 | A1 | 10/2015 | Brown et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.

(56) References Cited

OTHER PUBLICATIONS jsp%3Farnumber%3D817091>, pp. 1-6.
International Search Report from International Application No. PCT/US14/10267, pp. 1-5, dated Jul. 8, 2014.
Written Opinion of the International Searching Authority from International Application No. PCT/US14/10267, pp. 1-29, dated Jul. 8, 2014.
International Search Report and Written Opinion of the International Searching Authority from International Application No. PCT/US2014/061254, pp. 1-29, dated Jan. 8, 2015.
International Search Report and Written Opinion of the International Searching Authority from International Application No. PCT/US2014/061248, pp. 1-11, dated Jan. 13, 2015.
International Search Report and Written Opinion of the International Searching Authority from International Application No. PCT/US2014/061258, pp. 1-14, dated Jan. 13, 2015.
International Search Report and Written Opinion of the International Searching Authority from International Application No. PCT/US2014/061257, pp. 1-12, dated Jan. 14, 2015.
International Search Report and Written Opinion of the International Searching Authority from International Application No. PCT/US2014/062306, pp. 1-12, dated Jan. 26, 2015.
International Search Report and Written Opinion of the International Searching Authority from International Application No. PCT/US2014/063601, pp. 1-12, dated Jan. 27, 2015.
International Search Report and Written Opinion of the International Searching Authority from International Application No. PCT/US2014/072907, pp. 1-11, dated Mar. 27, 2015.

\* cited by examiner

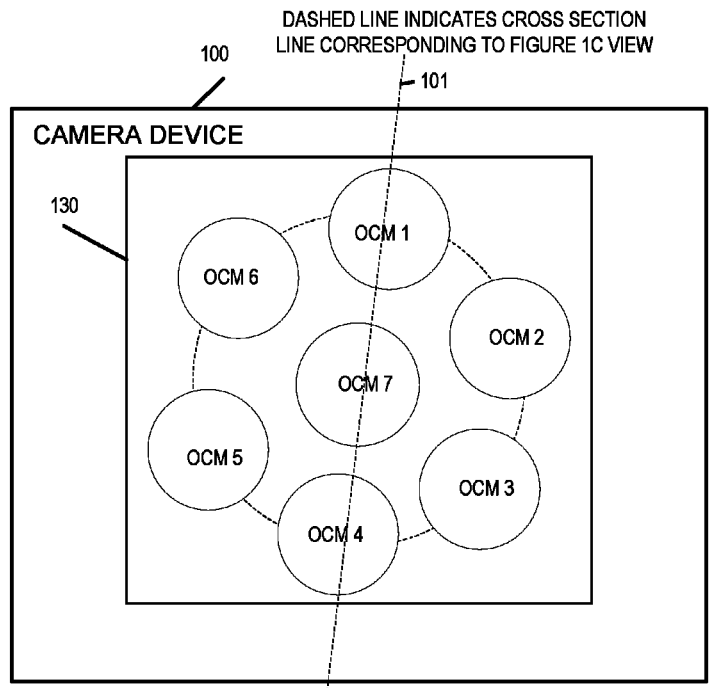
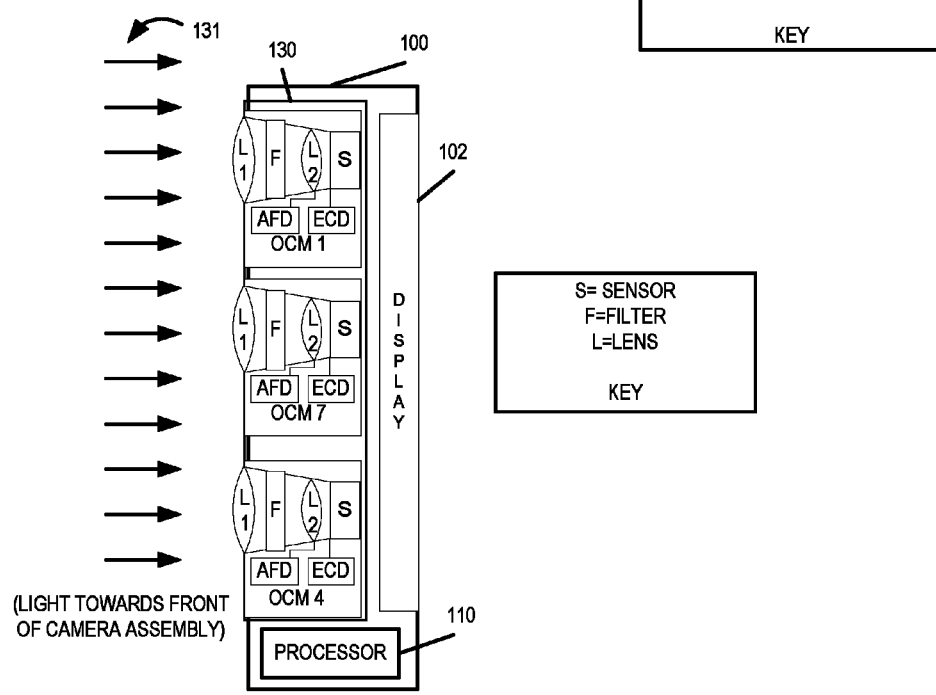
FIGURE 1B
FIGURE 1C

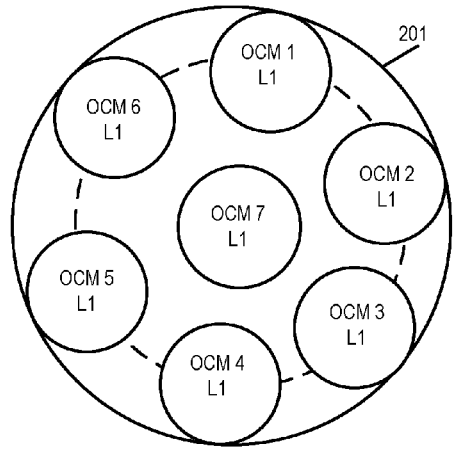

FIGURE 6A

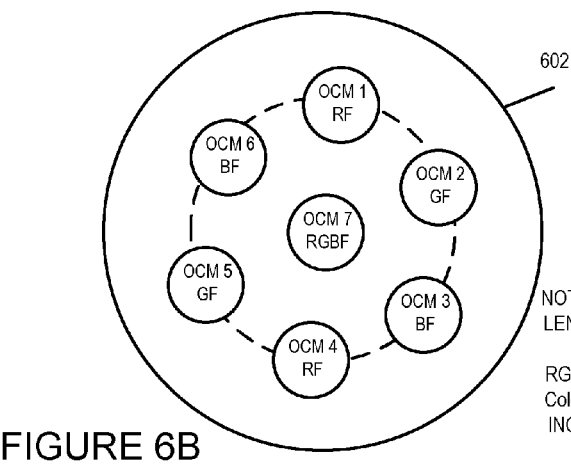

GF= GREEN FILTER
BF= BLUE FILTER
RF=RED FILTER
RGBF = RED, GREEN, BLUE
FILTERED SENSOR AREA
KEY

NOTE SINGLE COLOR FILTER PER LENS FOR OUTER LENSES - MULTIPLE LENS/OCM PER SINGLE COLOR

RGB Center Multicolor FILTER OR OPENING Allows All Colors to pass but Sensor Area Corresponding to OCM 7 INCLUDES R,G, and B Filters corresponding to different sensor areas - OCM 7 is used for PREVIEW Sensors for OCM 1 through OCM 6 have no filters

FIGURE 6B

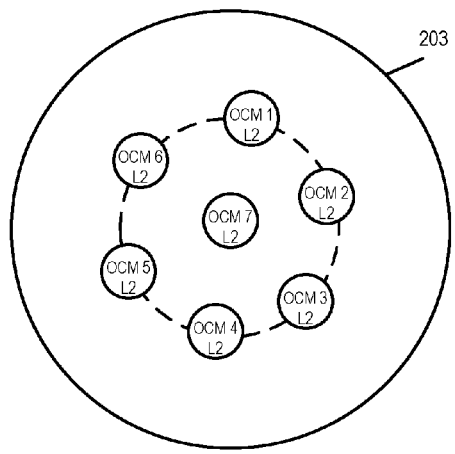

FIGURE 6C

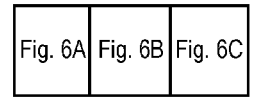

FIGURE 6

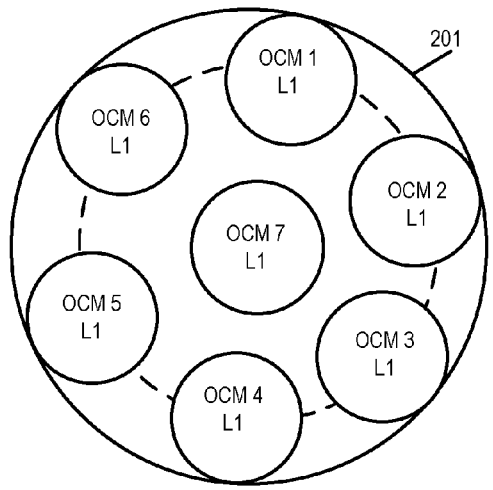
FIGURE 7A
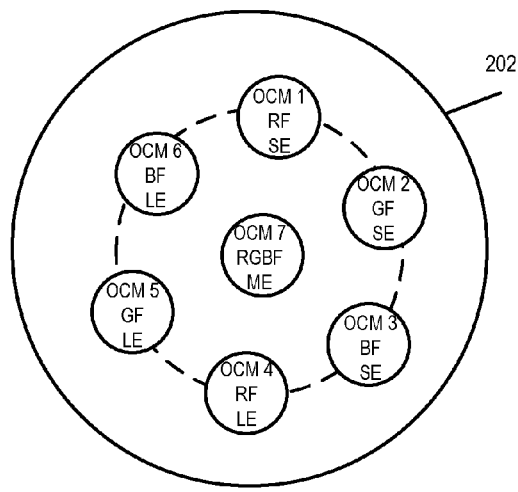
FIGURE 7B
SE = SHORT EXPOSURE
ME = MEDIUM EXPOSURE
LE = LONG EXPOSURE
KEY
NOTE SINGLE COLOR FILTER PER LENS - MULTIPLE LENS PER COLOR - Center is for Preview
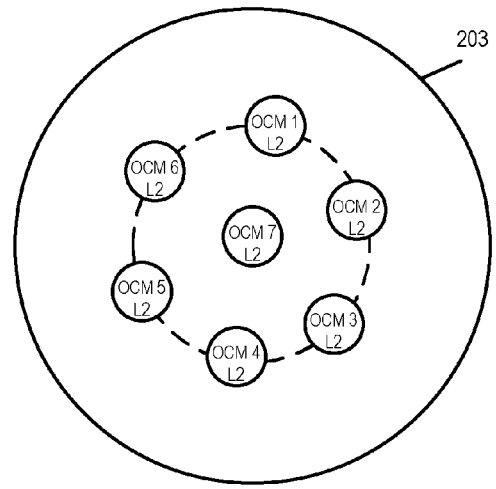
FIGURE 7C
| Fig. 7A | Fig. 7B | Fig. 7C |
FIGURE 7

METHODS AND APPARATUS RELATING TO A CAMERA INCLUDING MULTIPLE OPTICAL CHAINS

RELATED APPLICATIONS

The present application claims the benefit of the following U.S. Provisional Patent Applications 61/978,818 filed Apr. 11, 2014; 61/981,849 filed Apr. 20, 2014; 62/021,094 filed Jul. 4, 2014; 61/893,100 filed Oct. 18, 2013; 61/896,069 filed Oct. 26, 2013; 61/899,097 filed Nov. 1, 2013; 61/922,801 filed Dec. 31, 2013; 61/943,299 filed Feb. 21, 2014; and 61/943,302 filed Feb. 21, 2014; and is a continuation-in-part of each of the following U.S. patent applications: Ser. No. 14/327,510 filed Jul. 9, 2014; Ser. No. 14/327,512 filed Jul. 9, 2014; Ser. No. 14/327,514 filed Jul. 9, 2014; Ser. No. 14/327,515 filed Jul. 9, 2014; Ser. No. 14/327,517 filed Jul. 9, 2014; Ser. No. 14/327,518 filed Jul. 9, 2014; Ser. No. 14/327,492 filed Jul. 9, 2014; Ser. No. 14/327,524 filed Jul. 9, 2014; Ser. No. 14/327,525 filed Jul. 9, 2014; and Ser. No. 14/327,508 filed Jul. 9, 2014, and all of the aforementioned patent applications are hereby incorporated by reference in their entirety.

FIELD

The present application relates to camera methods and apparatus and, more particularly, to methods and apparatus related to camera apparatus including multiple optical chains, e.g., optical chains that may have optical paths that are longer than a camera is deep.

DISCUSSION

High quality digital cameras have to a large extent replaced film cameras. However, like film cameras, with digital cameras much attention has been placed by the camera industry on the size and quality of lenses which are used on the camera. Individuals seeking to take quality photographs are often encouraged to invest in large bulky and often costly lenses for a variety of reasons. Among the reasons for using large aperture lenses is their ability to capture a large amount of light in a given time period as compared to smaller aperture lenses. Telephoto lenses tend to be large not only because of their large apertures but also because of their long focal lengths. Generally, the longer the focal length, the larger the lens. A long focal length gives the photographer the ability to take pictures from far away.

In the quest for high quality photos, the amount of light which can be captured is often important to the final image quality. Having a large aperture lens allows a large amount of light to be captured allowing for shorter exposure times than would be required to capture the same amount of light using a small lens. The use of short exposure times can reduce blurriness especially with regard to images with motion. The ability to capture large amounts of light can also facilitate the taking of quality images even in low light conditions. In addition, using a large aperture lens makes it possible to have artistic effects such as small depth of field for portrait photography.

Large lenses sometimes also offer the opportunity to support mechanical zoom features that allow a user to optically zoom in or out and/or to alter the focal length of the lens which is important for framing a scene without the need to move closer or further from the subject.

While large lenses have many advantages with regard to the ability to capture relatively large amounts of light compared to smaller lenses, support large zoom ranges, and often allow for good control over focus, there are many disadvantages to using large lenses.

Large lenses tend to be heavy requiring relatively strong and often large support structures to keep the various lenses of a camera assembly in alignment. The heavy weight of large lenses makes cameras with such lenses difficult and bulky to transport. Furthermore, cameras with large lenses often need a tripod or other support to be used for extended periods of time given that the sheer weight of a camera with a large lens can become tiresome for an individual to hold in a short amount of time.

In addition to weight and size drawbacks, large lenses also have the disadvantage of being costly. This is because of, among other things, the difficultly in manufacturing large high quality optics and packaging them in a manner in which they will maintain proper alignment over a period of time which may reflect the many years of use a camera lenses is expected to provide.

A great deal of effort has been directed in the camera industry to supporting the use of large camera lenses and packaging them in a way that allows different lenses to be used in an interchangeable manner on a camera body. However, for the vast majority of camera users, the drawbacks to cameras with large lenses means that camera users tend not to use large lenses with such lenses often being left to professionals and/or photo enthusiasts willing to incur the expense and trouble of buying and using large lenses.

In fact, many camera owners who own cameras with large high quality lenses often find themselves taking pictures with small pocket size cameras, often integrated into other devices such as their cell phones, personal digital assistants or the like, simply because they are more convenient to carry. For example, cell phone mounted cameras are often more readily available for use when an unexpected photo opportunity arises or in the case of a general family outing where carrying large bulky camera equipment may be uncomfortable or undesirable.

To frame a given scene from a given point, the focal length (hence size) of the lens depends on the size (area) of the image sensor. The smaller the image sensor, the smaller the focal length and the smaller the lens required. With advances in sensor technology, it is now possible to make small sensors, e.g., 5×7 mm$^2$ sensors, with relatively high pixel count, e.g., 8 megapixels. This has enabled the embedding of relatively high resolution cameras in small devices such as cell phones. The small sensor size (compared to larger cameras such as changeable lens single-lens reflex (SRL) cameras) enables small focal length lenses which are much smaller and lighter than larger focal length lenses required for cameras with larger sensors.

Cell phone mounted cameras and other pocket sized digital cameras sometimes rely on a fixed focal length lens which is also sometimes referred to as a focus-free lens. With such lenses the focus is set at the time of manufacture, and remains fixed. Rather than having a method of determining the correct focusing distance and setting the lens to that focal point, a small aperture fixed-focus lens relies on a large depth of field which is sufficient to produce acceptably sharp images. Many cameras, including those found on most cell phones, with focus free lenses also have relatively small apertures which provide a relatively large depth of field. There are also some high end cell phones that use auto focus cameras.

For a lens of a digital camera to be useful, it needs to be paired with a device which detects the light passing through the lens and converts it to pixel (picture element) values. A megapixel (MP or Mpx) is one million pixels. The term is often used to indicate the number of pixels in an image or to express the number of image sensor elements of a digital camera where each sensor element normally corresponds to one pixel. Multi-color pixels normally include one pixel value for each of the red, green, and blue pixel components.

In digital cameras, the photosensitive electronics used as the light sensing device is often either a charge coupled device (CCD) or a complementary metal oxide semiconductor (CMOS) image sensor, comprising a large number of single sensor elements, each of which records a measured intensity level.

In many digital cameras, the sensor array is covered with a patterned color filter mosaic having red, green, and blue regions in an arrangement. In such a filter based approach to capturing a color image, each sensor element can record the intensity of a single primary color of light. The camera then will normally interpolate the color information of neighboring sensor elements, through a process sometimes called demosaicing, to create the final image. The sensor elements in a sensor array using a color filter are often called "pixels", even though they only record 1 channel (only red, or green, or blue) of the final color image due to the filter used over the sensor element.

While a filter arrangement over a sensor array can be used to allow different sensor elements to capture different colors of light thus allowing a single sensor to capture a color image, the need to carefully align the filter area with individual pixel size sensor elements complicates the manufacture of sensor arrays as compared to arrays which do not require the use of a multi-color filter array.

While small focal length lenses paired with relatively high resolution sensors have achieved widespread commercial success in cell phones and pocket cameras, they often leave their owners longing for better picture quality, e.g., picture quality that can only be achieved with a larger pixel area and a larger lens opening to collect more light.

Smaller sensors require smaller focal length lenses (hence smaller lenses) to frame the same scene from the same point. Availability of high pixel count small sensors means that a smaller lens can be used. However, there are a few disadvantages to using smaller sensors and lenses. First, the small pixel size limits the dynamic range of the sensor as only a small amount of light can saturate the sensor. Second, small lenses collect less total light which can result in grainy pictures. Third, small lenses have small maximum apertures which make artistic effects like small depth of field for portrait pictures not possible.

In view of the above discussion, it should be appreciated that there is a need for improved camera methods and/or apparatus which can provide one or more of the benefits commonly associated with large lenses but in a way that allows a camera to be implemented in a compact manner. Thus, it should be appreciated that there is a need for new photographic methods and apparatus which can provide some combination of the benefits commonly associated with large lenses, e.g., a relatively large lens area for capturing light, with at least some of the benefits of small focal length lenses, e.g., compact size. Additionally, it would be desirable if in some but not necessarily all embodiments the disadvantages, such as limited dynamic range and/or depth of field associated with small focal length lenses, could be avoided and/or such advantages reduced without requiring the use of large lenses.

SUMMARY OF THE INVENTION

Various methods and apparatus relate to implementing a camera in a compact manner by using one or more light redirection devices to facilitate a compact camera design.

Various features are directed to methods and apparatus for obtaining some or all of the benefits of using relatively large and long lens assemblies without the need for large lens and/or long lens assemblies, through the use of multiple optical chain modules in combination.

Optical chain modules including, in some embodiments, relatively short focal length lenses which require relatively little depth within a camera are used in some embodiments. While use of short focal length lens can have advantages in terms of small lens width, the methods and apparatus of the present are not limited to the use of such lenses and can be used with a wide variety of lens types. In addition, while numerous embodiments are directed to autofocus embodiments, fixed focus embodiments are also possible and supported.

An optical chain, in various embodiments, includes a first lens and an image sensor. Additional lenses and/or one or more optical filters may be included between the first lens of an optical chain module and the image sensor depending on the particular embodiment. In some cases there may be one or more optical filters before the first lens.

The use of multiple optical chain modules is well suited for use in devices such as cell phones and/or portable camera devices intended to have a thin form factor, e.g., thin enough to place in a pocket or purse. By using multiple optical chains and then combining the captured images or portions of the captured images to produce a combined image, improved images are produced as compared to the case where a single optical chain module of the same size is used.

While in various embodiments separate image sensors are used for each of the individual optical chain modules, in some embodiments the image sensor of an individual optical chain module is a portion of a CCD or other optical sensor dedicated to the individual optical chain module with different portions of the same sensor serving as the image sensors of different optical chain modules.

In various embodiments, images of a scene area are captured by different optical chain modules and then subsequently combined either by the processor included in the camera device which captured the images or by another device, e.g., a personal or other computer which processes the images captured by the multiple optical chains after offloading from the camera device which captured the images.

The combined image has, in some embodiments a dynamic range that is larger than the dynamic range of an individual image used to generate the combined image.

In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

Numerous additional features and embodiments are described in the detailed description which follows.

BRIEF DESCRIPTION OF THE DRAWINGS

FIG. 1B illustrates a frontal view of an apparatus implemented in accordance with an exemplary embodiment of the present invention which incorporates multiple optical chain modules in accordance with the present invention with lenses which are viewable from the front of the camera.

FIG. 1C, which is a side view of the exemplary apparatus of FIG. 1B, illustrates further details of the exemplary apparatus.

FIG. 6, which comprises the combination of FIGS. 6A, 6B, and 6C, shows an exemplary combination of lenses and filters used in one exemplary embodiment in which a single color filter is used in at least some of the different optical chain modules.

FIG. 7, which comprises the combination of FIGS. 7A, 7B, and 7C, shows an exemplary combination of lenses and filters used in one exemplary embodiment in which exposures of different duration are used for different optical chain modules and a single color filter is used in at least some of the different optical chain modules.

DETAILED DESCRIPTION

Figure 1A:
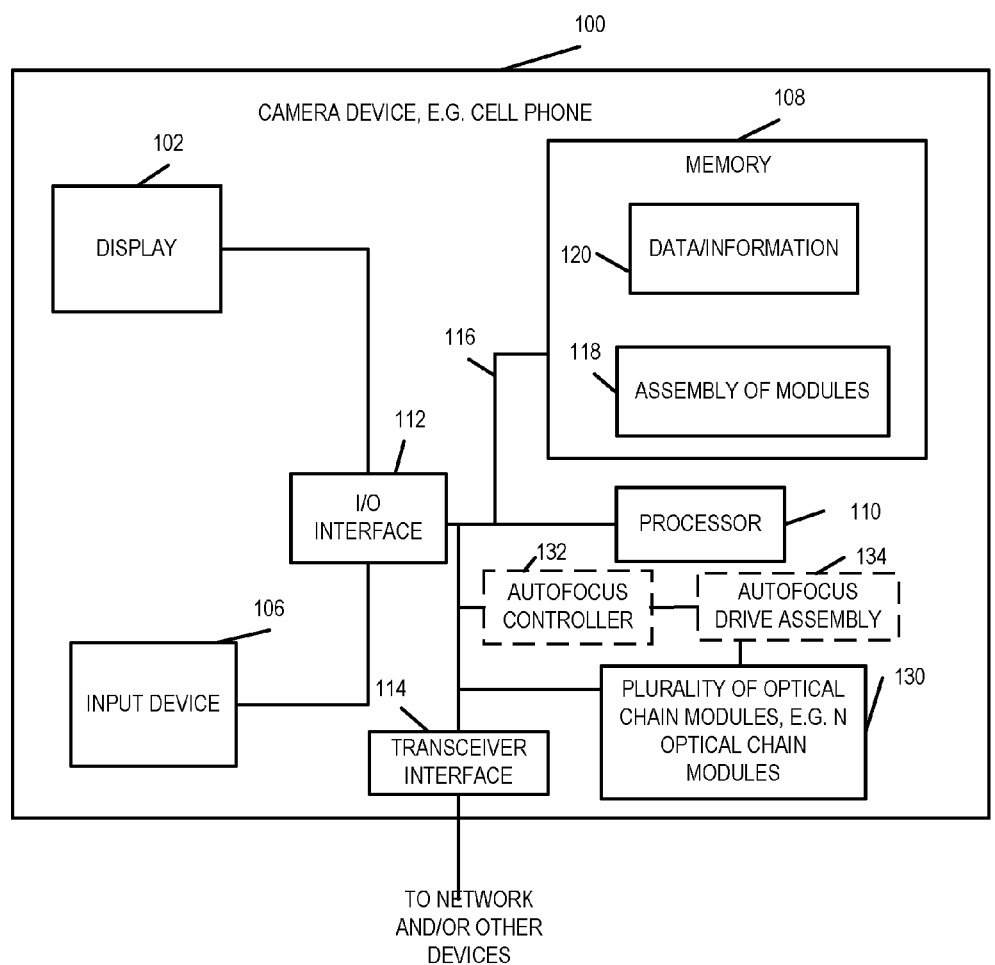
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, an input device 106, memory 108, a processor 110, a transceiver interface 114, e.g., a cellular interface, a WIFI interface, or a USB interface, an I/O interface 112, and a bus 116 which are mounted in a housing represented by the rectangular box touched by the line leading to reference number 100. The input device 106 may be, and in some embodiments is, e.g., keypad, touch screen, or similar device that may be used for inputting information, data and/or instructions. The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, a transceiver interface 114, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. Transceiver interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The transceiver interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively.

FIG. 1B shows the front of the camera device 100. Rays of light 131 shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

The front of the plurality of optical chain modules 130 is visible in FIG. 1B with the outermost lens of each optical chain module appearing as a circle represented using a solid line. In the FIG. 1B example, the plurality of optical chain modules 130 include seven optical chain modules OCM1 through OCM 7 which include lenses represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, such as the FIG. 6 embodiment, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain.

Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1, OCM 7, OCM 4 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes an auto focus drive (AFD) also sometimes referred to as an auto focus device which can alter the position of the second lens L2, e.g., move it forward or back, as part of a focus operation. An exposure control device (ECD) which controls the light exposure time of the sensor to which the ECD corresponds, is also included in each of the OCMs shown in the FIG. 1C embodiment. The AFD of each optical chain module operates under the control of the autofocus controller 132 which is responsive to user input which identifies the focus distance, e.g., by the user highlighting an object in a preview image to which the focus is to be set. The autofocus controller while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., ⅕th, 1/10th, 1/20th or even less than the overall side to side length or even top to bottom length of the camera device visible in FIG. 1B.

Figure 2:
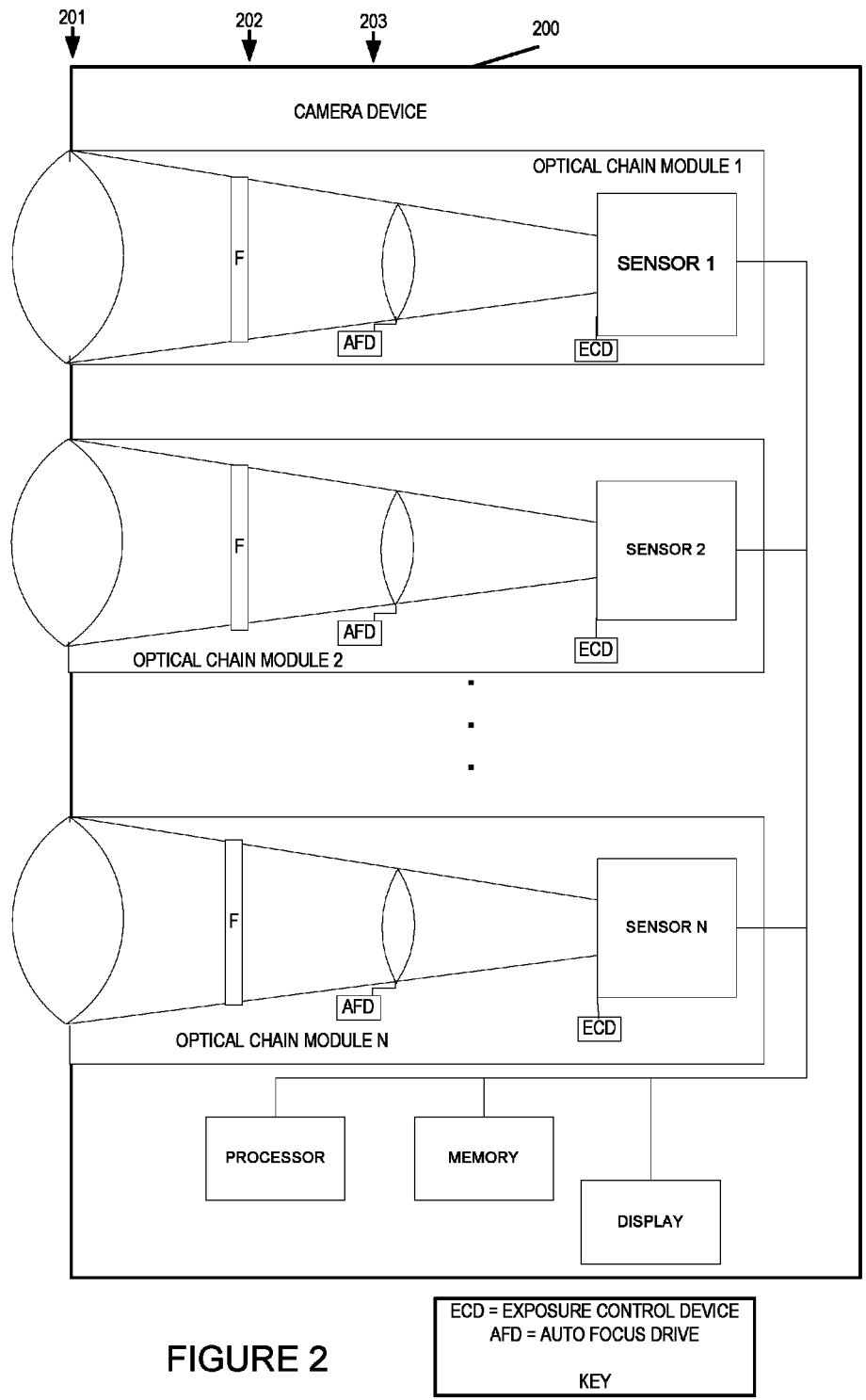
FIG. 2 illustrates a camera device implemented in accordance with one embodiment of the present invention.

FIG. 2 illustrates a camera device 200 implemented in accordance with the invention. The FIG. 2 device includes many or all of the same elements shown in the device 100 of FIGS. 1A-1C. In the FIG. 2 embodiment the optical chain modules are shown as independent assemblies with the autofocus drive of each module being a separate AFD element.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
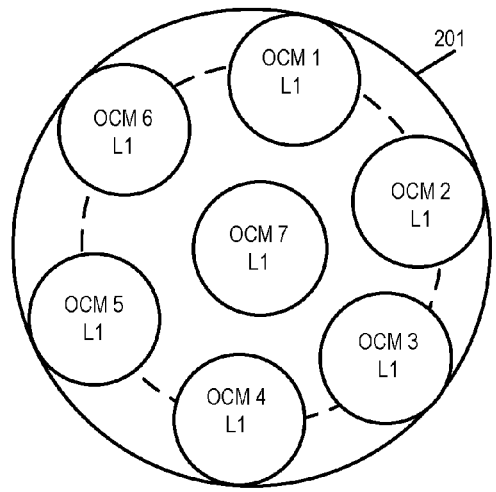
FIG. 3A shows an exemplary lens configuration which may be used for the set of outer lenses of the camera device shown in FIGS. 1A-1C.
Figure 3B:
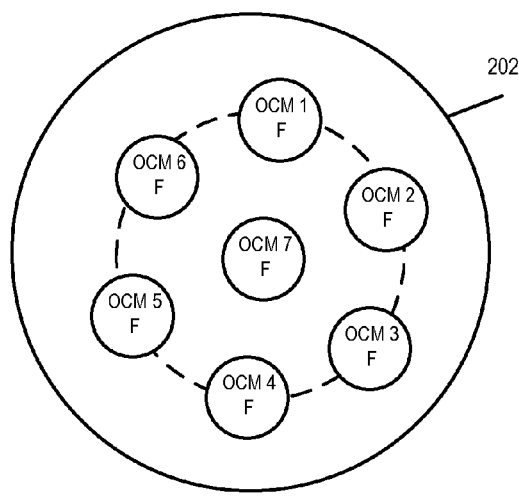
FIG. 3B illustrates an exemplary filter arrangement which is used in the camera of FIGS. 1A-1C in some embodiments.
Figure 3C:
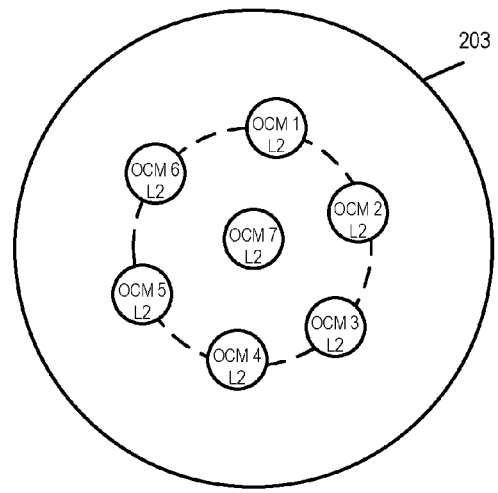
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 occupy much of the outer circular area corresponding to the front of the camera modules as previously shown in FIG. 1B. However, as shown in FIG. 3B the filters corresponding to plane 202 occupy less space than the lenses shown in FIG. 3A while the inner lenses L2 shown in FIG. 3C occupy even less space.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
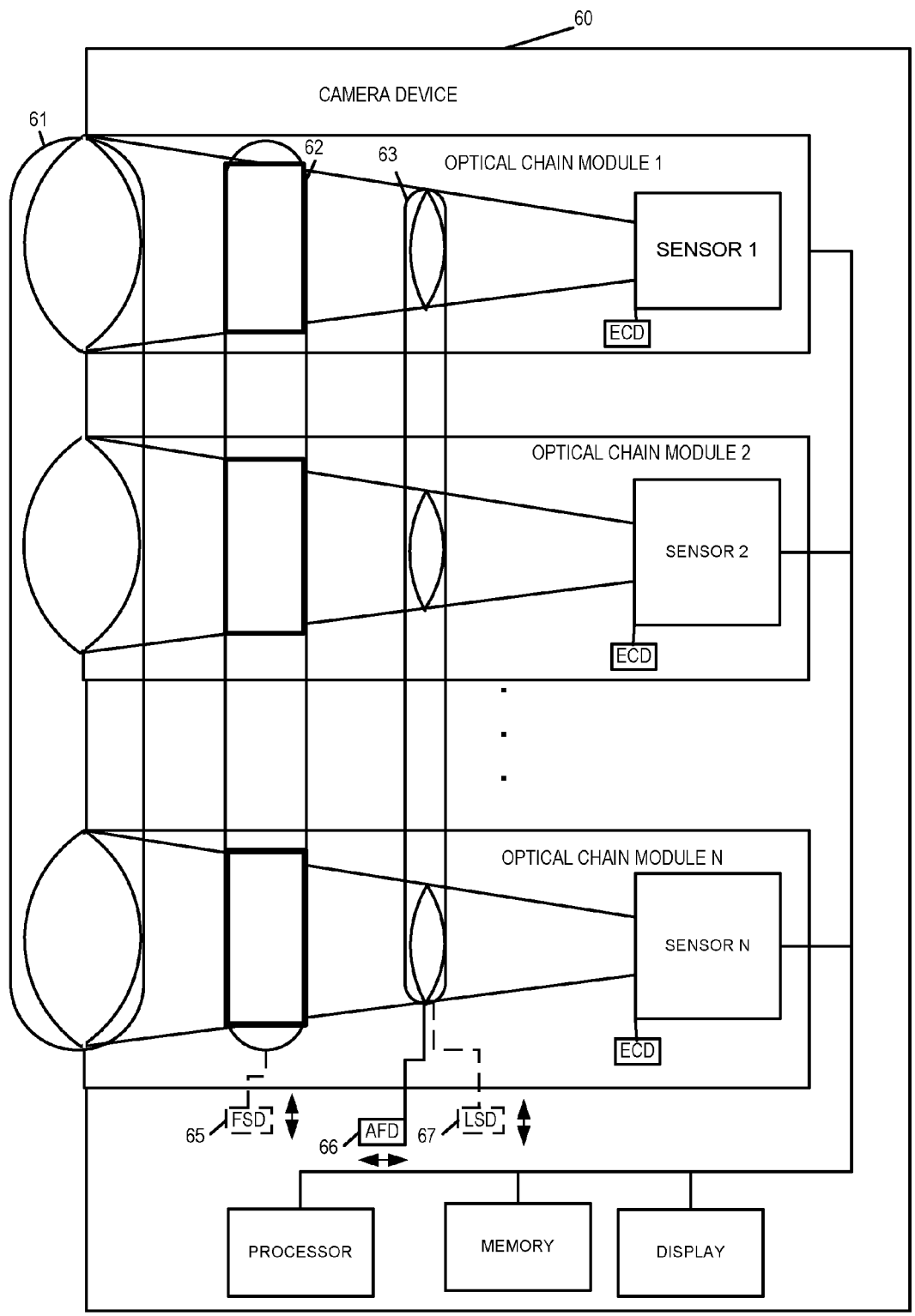
FIG. 4 illustrates an exemplary camera device in which the sets of outer lenses, filters, and inner lenses are mounted on corresponding platters.

A camera device 60 which includes platters of lenses and/or filters is shown in FIG. 4. Element 61 represents a platter of outer lenses L1 with 3 of the lenses being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F while platter 63 includes the inner lenses L2. As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 132 which may be, and often is, included in the camera device 60. A filter shift drive (FSD) 65 is included in embodiments where shifting of the platter 62 is supported as part of a filter change operation. The FSD 65 is responsive to the processor 110 which operates in response to user selection of a particular mode of operation and/or an automatically selected mode of operation and can move the platter 62 vertically, horizontally or in some combination of vertical and horizontal motion to implement a filter change operation. The FSD may be implemented with a motor and mechanical linkage to the platter 62. In some embodiments, the platter 62 may also be rotated to support changes. The rotation may be an off center rotation and/or may be performed in combination with one or more other platter position changes.

A lens shift drive (LSD) 67 is included in embodiments where shifting of the platter 63 is supported as part of a filter change operation. The LSD 67 is responsive to the processor 110 which operates in response to user selection of a particular mode of operation and/or an automatically selected mode of operation and can move the platter 63 vertically, horizontally or in some combination of vertical and horizontal motion to implement a lens change operation. The LSD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5A:
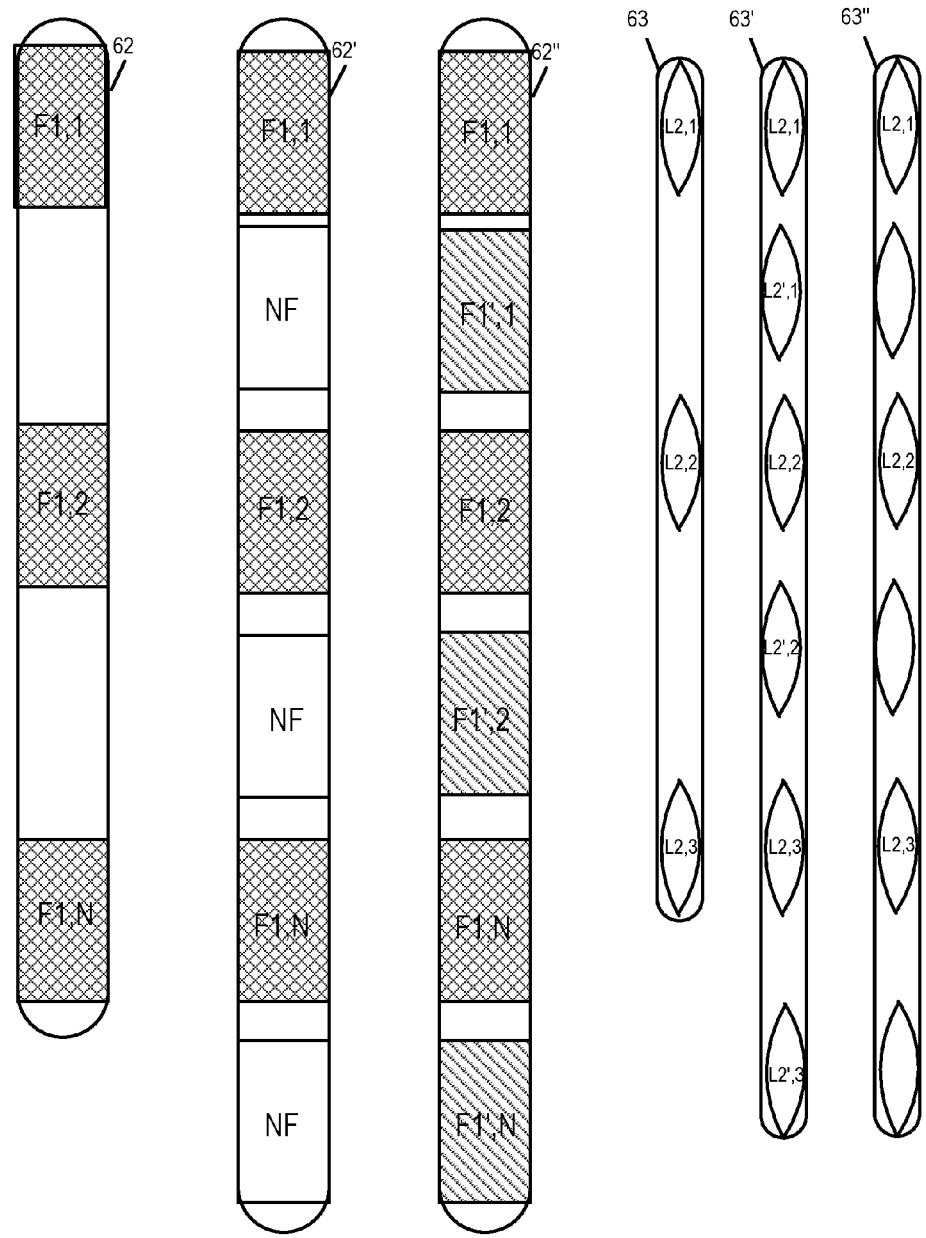
FIG. 5A illustrates various filter and lens platters that may be used in the camera device shown in FIG. 4 depending on the particular embodiment.
Figure 5B:
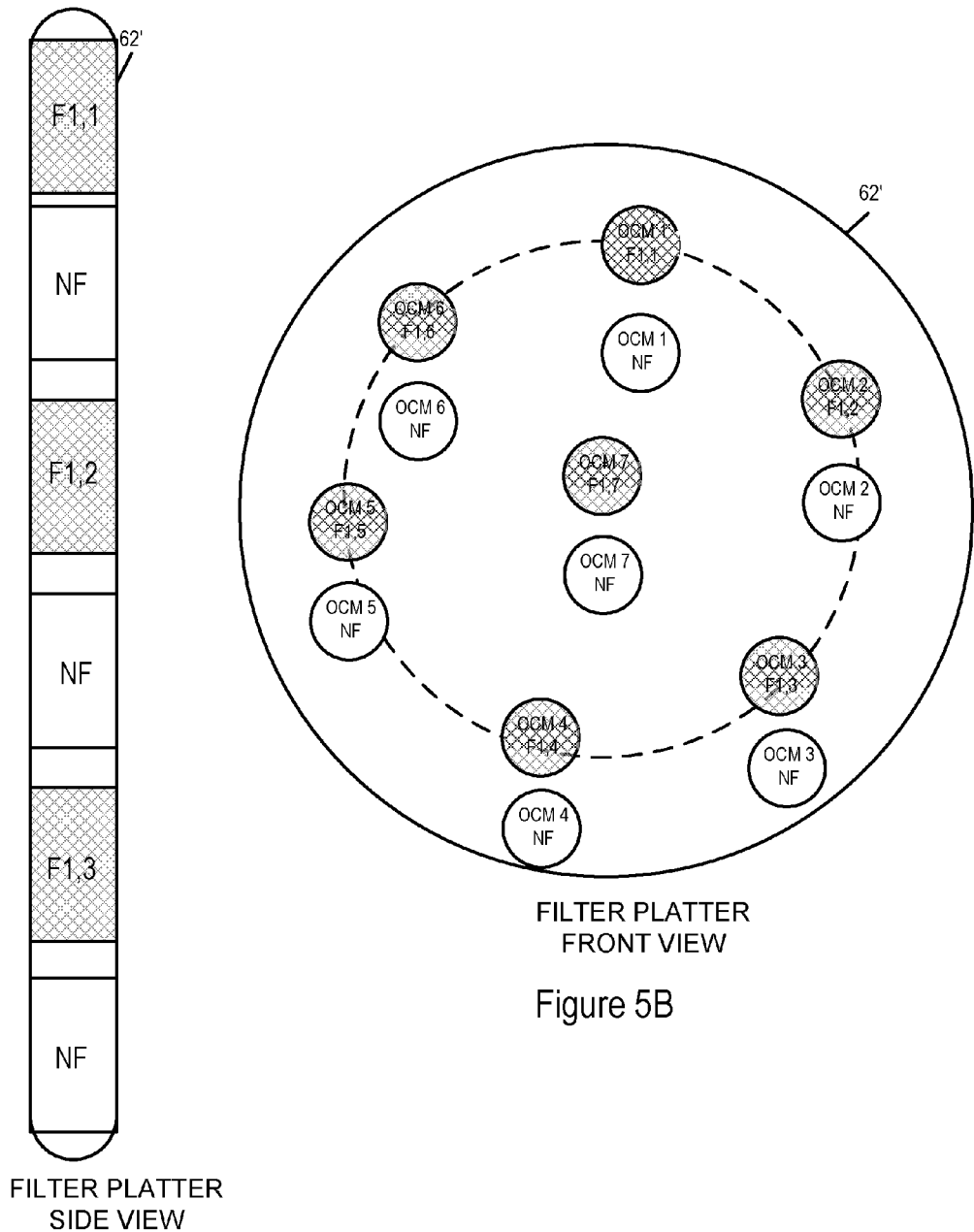
FIG. 5B illustrates the filter platter arrangement shown in FIG. 5A when viewed from the side and when viewed from the front.

FIG. 5A illustrates various exemplary platters that can, and in some embodiments are, used as the filter platter and/or inner lens platter in the camera device 60 of FIG. 4. In the FIG. 5A example N is three (3) but other values of N are possible depending on the embodiment. FIG. 5B shows the exemplary lens platter 62' of FIG. 5A when viewed from the side and from the front.

Platter 62 represents a platter with a single set of filters F1,1 corresponding to OCM1, F1,2 corresponding to OCM 2 and F1,3 corresponding to OCM 3.

Platter 62' represents an alternative platter that can, and in some embodiments is, used in place of platter 62. NF is use to represent a hole or No Filter (NF) area of the platter 62'. As should be appreciated by simply shifting platter 62' vertically the filters F1 can be replaced by holes thereby removing the color or other types of filters previously included in the optical chain modules.

Platter 62" of FIG. 5A represents a platter which includes alternative filters F1' which can be switched for the filters F1 by moving the palter 62" vertically. Thus platter 62" is used to show how filters can be switched for other filters by simple movement of a platter while platter 62' shows how filters can be removed from the optical paths included in a plurality of optical chain modules by shifting of the platter on which a set of filters are mounted.

Lens platter 63 shows a platter of inner lenses L2 corresponding to first, second and third optical camera modules. Lens platter 63' is an alternative platter which shows how alternative lenses L2' can be included on a lens platter and easily swapped for the lenses L2 by simple movement of the platter 63' vertically or horizontally. Lens platter 63" is used to show that a lens platter may include holes as an alternative to alternative lenses. Any of lens platters 63, 63' or 63" could be used in the camera device 60 shown in FIG. 4. While two lens sets are included in platter 63', multiple lens and/or hole combinations, e.g., 2, 3 or more, may be included in a single platter. Similarly a large number of alternative filter, hole alternatives may be supported in a single filter platter. A platter can also have combinations of lenses, filters and holes and filters could be swapped for lenses or holes.

As should be appreciated given the larger number of lens/filter combinations that can be supported through the use of platters, a single camera device including a number of optical chain modules may support a large number of alternative modes of operation.

It should be appreciated that the exposure control of various optical chain modules may be varied along with the filters and/or lenses used at any given point in time allowing for a wide degree of flexibility and control over the images captured at any given point in time.

FIGS. 6A, 6B and 6C corresponding to one particular filter lens combination are used in some embodiments.

FIG. 6A shows the use of 7 optical chain modules at plane 201 (the outer lens plane corresponding to lenses L1) as viewed from the front of the camera device. FIG. 6C shows the inner lens plane 203. The configuration shown in FIGS. 6A and 6C is the same or similar to that previously discussed with reference to the FIG. 3 embodiment. FIG. 6B shows a particular color filter arrangement used in some embodiments. The filter arrangement shown in FIG. 6B may be used in the set of optical chain modules 130 before the sensors, e.g., between the set of L1 and L2 lenses. However, this position is not required for some embodiments and the user of inner lenses L2 is also not required for some embodiments.

The filter configuration 602 includes single color filters in each of a plurality of optical chain modules, e.g., the six outer optical chain modules (OCM1 to OCM6). Multiple optical chain modules are dedicated to each of the three colors, red (R), green (G) and blue (B). The optical chain modules (OCM1, OCM4) with the red filter (RF) pass and sense red light. The optical chain modules (OCM 2, OCM 5) with the green filter (GF) pass and sense green light. The optical chain modules (OCM 3, OCM 6) with the blue filter (BF) pass and sense blue light.

By using optical chain modules dedicated to a single color, the optical chains can be optimized for the spectral range corresponding to the particular color to which the chain corresponds. In addition post capture color compensation can be simplified since each of the six outer optical modules capture a single known color. In addition, noise can be averaged between the sensor corresponding to the same color and/or different exposure times can be used for the different OCMs corresponding to an individual color extending the dynamic range of the sensors to cover a range wider than could be captured by a single sensor. In addition different exposure times may be used for different colors to take into consideration particular color biased lighting conditions and/or facilitate the implementation of particular color effects that may be desired. Notably the individual colors are captured at a pixel result in a resolution equal to that of the sensor as opposed to the case where different portions of a single sensor are used to capture different colors, e.g., with each color R, G, B being captured at a resolution ⅓ that of the pixel resolution of the image sensor being used in an optical chain module.

While in some embodiments a composite image is generated and displayed as a preview image, in some embodiments to reduce processing time and/or the time required to display a composite image which may be delayed by the time required to combine multiple images, an image captured by a single sensor is displayed as the preview image on the display of the camera device. The multi-colored filter incorporated into the sensor, e.g., Bayer filter, of OCM 7 allows a color image to be captured by a single lens and used as the preview image. While the image may be of lower quality than that which can be generated by creating a composite of the multiple OCMs given the small display size the difference in image quality between the preview image generated from OCM 7 and that of a composite image may not be sufficient to justify the processing, power, and/or time required to generate a composite image for preview purpose. Accordingly, the FIG. 6B filter arrangement provides a great deal of flexibility while being able to support a wide variety of exposure and other image capture related features.

The ability to use different exposure times with different optical chain modules is illustrated further with regard to a camera embodiment which will now be discussed with regard to FIGS. 7A, 7B and 7C. The lens configurations of FIGS. 7A and 7C are similar to that shown in FIGS. 6A and 6C. The filter arrangement shown in FIG. 7B is also the same or similar to that shown in FIG. 6B but in the FIG. 7B example exposure time is also included. While the exposure is controlled by use of the exposure control device in some embodiments the concept can be understood from FIG. 7B. In FIG. 7B SE is used to indicate short exposure, LE is used to indicate long exposure, and ME is used to indicate medium exposure. The preview image is generated using the medium exposure optical chain module while the two different optical chain modules corresponding to a given color use different exposures. In this way the short exposure time can be used to reliably capture information corresponding to light (e.g., bright) portions of an image while the long exposure optical chain module can be used to capture information corresponding to the darker portions of an image. As discussed above, the sensed pixel values from the two optical chains can be processed to exclude values generated by saturated sensors and to combine pixel values corresponding to the same image area in a manner weighted according to the exposure duration for pixel value within the acceptable operating range of the optical chain module's sensors.

While different durations can and often are achieved by controlling sensor exposure times, different filters in different optical chain modules may, and are, used to achieve different light exposures in some embodiments.

Figure 8:
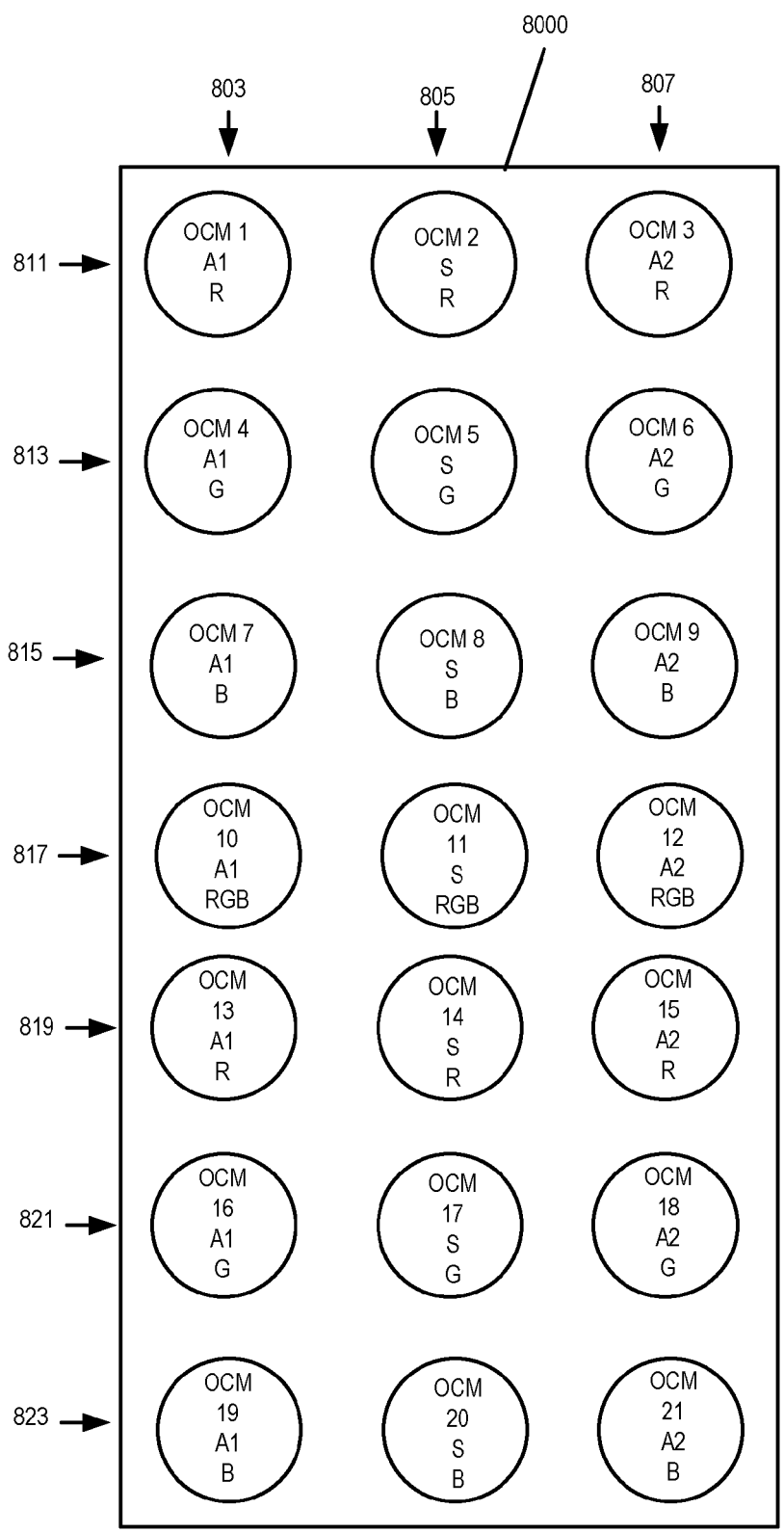
FIG. 8 illustrates an optical chain arrangement used in one panoramic camera embodiment in which multiple optical chains and different lens angles are used to capture images that are well suited for combining into a panoramic image.

FIG. 8, illustrates an optical chain arrangement used in one panoramic camera device 8000 in which multiple optical chains and different lens angles are used to capture images that are well suited for combining into a panoramic image. A1 represents a first non-zero angle, S represents a straight or 0 degree angle, and A2 represents a second non-zero angle. In one embodiment A1 causes the corresponding camera chain module to capture images to the right of the camera, S causes the corresponding camera chain module to capture images straight ahead of the camera, and A2 causes the corresponding camera chain module to capture images to the left the camera, from the perspective of the user behind the camera. In addition to captured images left and right of the camera it should be appreciated that the optical chain modules capture some image portion which is also captured by the adjacent optical chain module. Thus, the OCMs in columns 803, 805 and 807 capture different scenes which, while overlapping, can be stitched together to provide an ultra wide angle panoramic image. The OCMs in each of rows 811, 813, 815, 817, 819, 821, 823 capture different versions of the same scene.

The panoramic camera device 8000 includes multiple optical chain modules corresponding to each of the left, right and center views. Twenty one optical chain modules (seven sets of three) are shown allowing for two optical chain modules per color (R, G, B) plus a seventh multi-color (R, G, B) optical chain module which can be used to support a preview mode of operation. The multi-color optical chain module may include a sensor with a multicolor filter, e.g., a Bayer pattern filter, allowing the single sensor to capture the multiple colors using different portions of the sensor. While the panoramic configuration shown in FIG. 8 is different from that of the non-panoramic camera embodiments previously discussed the exposure control and separate color capture benefits remain the same as those discussed with regard to the other embodiments.

While FIG. 8 illustrates a particular panoramic embodiment, it should be appreciated that embodiments such as those shown in FIGS. 3 and 4 can, and in sometimes are, used to support taking of panoramic pictures. In one such embodiment a prism or angled lens is inserted into one or more optical chain modules, e.g., by rotation, vertical movement, horizontal movement and/or a combination of vertical and horizontal movement of a platter upon which the prism or lens is mounted. The prisms or changes in lens angles change the scene area perceived by one or more optical chain modules allowing the different optical chain modules to capture different views of a scene which can, and in some embodiments are, used to generate a panoramic image, e.g., picture. Thus, camera modules used to capture images corresponding to the same scene which are then combined to generate a combined image can also be used at a different time to capture images corresponding to different views and/or scenes which can then be subsequently combined to form a panoramic image, e.g., photograph.

Accordingly, it should be appreciated that ultra wide angle panoramic images can be generated using multiple optical chain modules of the type previously discussed thereby providing panoramic cameras many of the benefits of large lens without the need for the camera depth, weight and other disadvantages associated with large lenses.

It should be appreciated that because camera chain modules are separated from one another the multi-optical chain module embodiments of the present invention are well suited for stereoscopic image generation and for generating image depth maps. Accordingly the camera devices of the present invention support a wide range of applications and modes of operation and provide significant amounts of image data which can be used to support a wide range of post capture image processing operations.

Having described apparatus and various embodiments, various methods which are supported and used in some embodiments will now be discussed with regard to various flow charts that are included in the present application.

Figure 9:
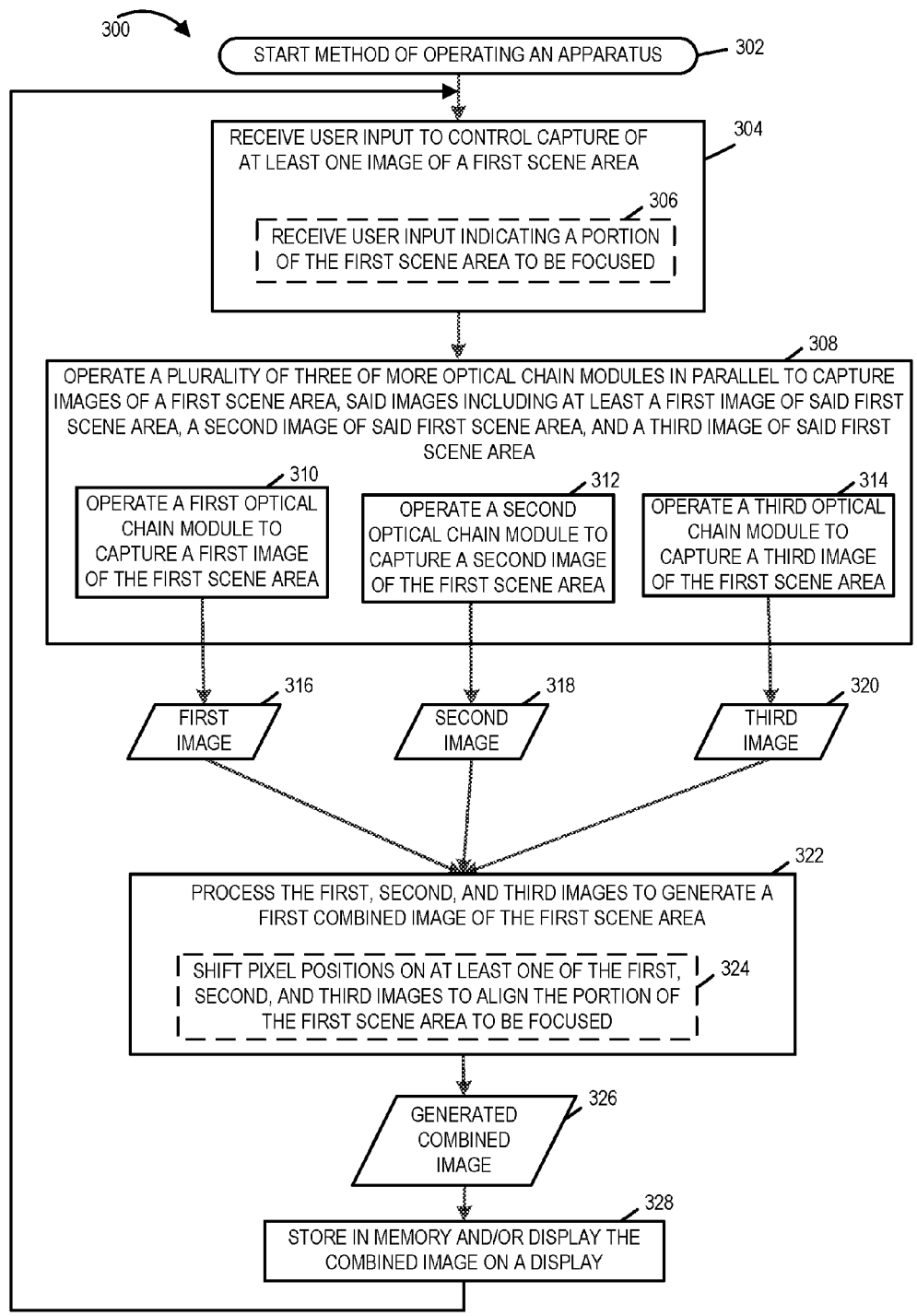
FIG. 9 illustrates an exemplary method of producing at least one image of a first scene area by operating a plurality of optical chain modules in accordance with one embodiment of the present invention.

Method 300 of FIG. 9 illustrates one exemplary method of producing at least one image of a first scene area in accordance with the present invention. The processing steps of the method 300 of FIG. 9 will now be explained in view of the camera device 100 of FIG. 1A.

The method 300 of FIG. 9 starts at start step 302 with the start of the steps of the method being implemented, e.g., on processor 110. Operation proceeds from start step 302 to step 304. In step 304, user input is received to control the capture of at least one image of the first scene area. The user input is received via input device 106 which may be, and in some embodiments is, a button or touch sensitive screen. In optional sub-step 306, the user input may, and in some embodiments does, indicate a portion of the first scene area that is to be focused, e.g., in an image to be captured or a combined image to be generated from two or more captured images. From step 304 processing proceeds to step 308.

In step 308, a plurality of three or more optical chain modules (OCMs), e.g., optical chain modules 130 of FIG. 1A, are operated in parallel to capture images of the first scene area, said images including at least a first image of said first scene area, a second image of said first scene area, and a third image of said first scene area. In some embodiments each one of the first, second and third optical chain modules captures a corresponding one of the first, second and third image respectively. In some embodiments, operating a plurality of three or more optical chain modules in parallel to capture images of the first scene area, said images including at least a first image of said first scene area, a second image of said first scene area, and a third image of said first scene area includes sub-processing steps 310, 312, and 314.

In sub-step 310 a first optical chain module is operated to capture a first image 316 of the first scene area. In most, but not all, embodiments, on capture of the first image 316, the image data and other data such as camera device configuration information associated with the first image is stored in the data/information 120 portion of memory 108 for later processing, output or display. In parallel with the processing of sub-step 310 processing of sub-steps 312 and 314 also occur. In sub-step 312 a second optical chain module is operated to capture a second image 318 of the first scene area. In most, but not all, embodiments on capture of the second image 318, the image data and other data such as camera device configuration information associated with the second image is stored in the data/information 120 portion of memory 108 for later processing, output or display. In sub-step 314 a third optical chain module is operated to capture a third image 320 of the first scene area. In most, but not all, embodiments on capture of the third image 320, the image data and other data such as camera device configuration information associated with the third image is stored in the data/information 120 portion of memory 108 for later processing, output or display. Processing then proceeds from step 308 to step 322.

In some embodiments, each optical chain module of the plurality of optical chain modules includes a lens and the lenses of the plurality of the optical chain modules are arranged along a circle. For example, when there are three optical chain modules, i.e., a first optical chain module, a second optical chain module, and a third optical chain module, the first optical chain module includes a first lens, the second optical chain module includes a second lens, and the third optical chain module includes a third lens. The first, second and third lenses are arranged uniformly along a circle, e.g. on the vertices of an equilateral triangle. In some embodiments the camera device 100 includes a fourth optical chain module including a fourth lens, said fourth lens being positioned in the center of the circle. Each of the first, second, third and fourth lens may be, and in some embodiments of the present invention are, the outer lens of each of their respective optical chain modules and are all positioned in the same plane. More generally, in some embodiments of the present invention, there are a plurality of N optical chain modules each including a lens. N–1 lenses of the plurality of optical chain modules are arranged along a circle with Nth lens being positioned in the center of the circle. FIG. 1B illustrates and example of a camera device 100 with seven optical chain modules which include 7 outer lenses shown as circles, i.e., OCM1, OCM2, OCM3, OCM4, OCM5, OCM6, and OCM7. The outer lens of optical chain modules OCM 1, OCM2, OCM3, OCM4, OCM5, and OCM6 are arranged along a circle and the outer lens of optical chain module OCM7 is positioned in the center of the circle.

In some embodiments of the present invention, the first optical chain module includes in addition to the first lens an image sensor referred to as a first image sensor. In some embodiments of the present invention, the second optical chain module includes an image sensor referred to as a second image sensor. In some embodiments of the present invention, the third optical chain includes an image sensor referred to as a third image sensor. In some embodiments of the present invention the plurality of lenses of the plurality of optical chain modules are mounted in a cell phone housing with the plurality of lenses oriented in the same direction and in the same plane of the housing. For example in the case of three optical chain modules, in some embodiments of the present invention, the first, second and third lenses of the first, second, and third optical chain modules respectively are mounted in a cell phone housing and are oriented in the same direction and in the same plane of the housing.

In step 322, said first, second, and third images are processed by processor 110 to generate a first combined image 326 of said first scene area. In some embodiments, including those embodiments of the present invention in which user input is received indicating a portion of the first scene area to be focused in the combined image, step 322 may, and in some embodiments does, include sub-step 324 wherein pixel positions on at least one of said first, second, and third images is shifted prior to generating said first combined image to align the portion of the first scene to be focused. Processing then proceeds to step 328 where the generated combined image is stored in data/information 120 of memory 108, e.g., for potential later display, output from the camera device, and/or additional processing and/or displayed on display 102 of camera device 100.

In some embodiments, processing step 322 and/or sub-step 324 are performed on an external device such as a computer. In such cases, the first, second and third images are outputted from the camera device 100 via transceiver 114 to the external computer for processing to generate the first combined image 326. The first combined image may then be stored in memory associated with the external device and/or displayed on a display associated with the external computer. In some embodiments of the present invention, the first combined image of the first scene area includes the same or fewer pixel values than either of said first, second or third images.

From step 328 processing proceeds to step 304 where processing continues and the method is repeated.

In some embodiments of the present invention, the size of the diameter of the first, second and third lens of the first, second, and third optical chain modules respectively are the same and the sensors of the first, second and third optical chain modules have the same number of pixels. In other embodiments of the present invention, one or more optical chain modules may, and in some embodiments do, have lenses with different diameter sizes and/or sensors with different numbers of pixels. In some embodiments of the present invention, the first, second and third lenses of the first, second and third optical chain modules respectively, are less than 2 cm in diameter and each of the first, second and third image sensors of the first, second and third optical chain modules support at least 8 Mpixels. In some embodiments of the present invention, the first and second lenses are each less than 2 cm in diameter and each of the first and second image sensors support at least 5 Mpixels. However in many embodiments the image sensors support 8 Mpixels or even more and in some embodiments the lenses are larger than 2 cm. Various combinations of lens and sensors may be used with a variety of lens sizes being used for different optical chains in some embodiments. In addition different optical chains may use lenses with different shapes, e.g., while the lens may be a spherical lens the perimeter of the lens may be cut into one of a variety of shapes. In one embodiment, lenses of different optical chain modules are shaped and arranged to minimize gaps between lenses. Such an approach can have the advantage of resulting in a smoother blur with regard to portions of captured images which are out of focus when combining images captured by different optical chain modules and result in an overall image which more closely approximates what might be expected had a single large lens been used to capture the scene shown in the combined image.

In accordance with some aspects of the present invention, the diameter size and arrangement of the lenses of the plurality of optical modules may and do vary. Similarly the number of pixels supported by the sensors of each of the plurality of optical modules may also vary for example depending on the desired resolution of the optical chain module.

Figure 10:
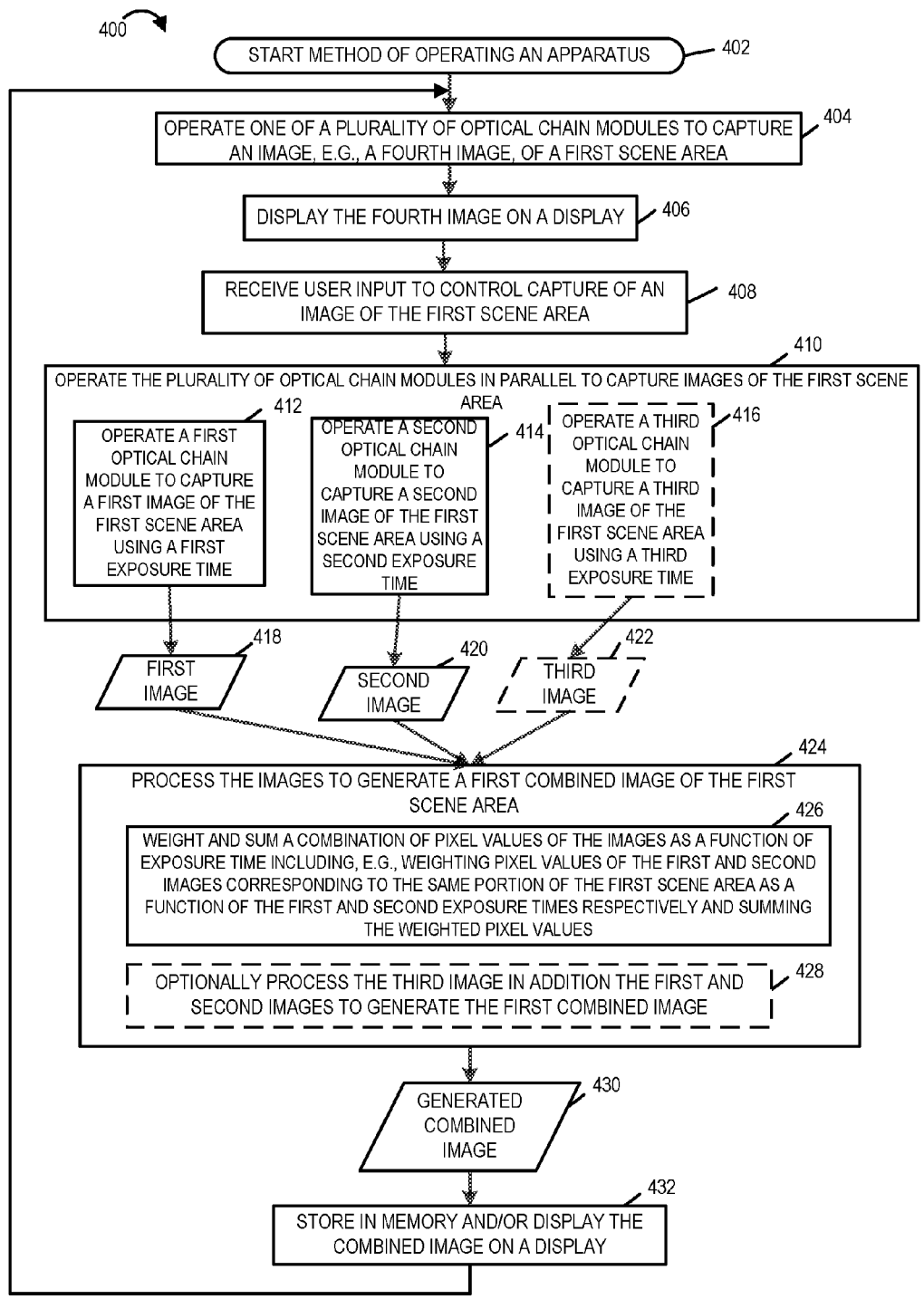
FIG. 10 illustrates an exemplary method of producing at least one image of a first scene area with an enhanced sensor dynamic range by operating two or more optical chain modules in accordance with one embodiment of the present invention.

Method 400 of FIG. 10 illustrates an embodiment of a method of producing at least one image of a first scene area in accordance with the present invention. The method 400 achieves enhanced sensor dynamic range by combining images captured through the operation of two or more optical chain modules using different exposure times. The processing steps of the method 400 of FIG. 10 will now be explained in view of the camera device 100 of FIG. 1A. For ease of explanation of the method 400, it will be assumed that the plurality of optical chain module 130 of camera device 100 of FIG. 1A includes two optical chain modules and in some embodiments an optional third optical chain module which will be referred to as a first, second and third optical chain module respectively.

The method 400 of FIG. 10 starts at start step 402 with the start of the steps of the method being implemented, e.g., on processor 110. Operation proceeds from start step 402 to step 404. In step 404, one of a plurality of optical chain modules of the camera device is operated to capture an image which will be referred to herein as a fourth image of the first scene. For example, one of said first, second or optional third optical chain modules may be, and in some embodiments is, operated to capture the fourth image. This fourth image is captured prior to capturing the first, second or third images which will be discussed in connection with step 410 below.

Processing then proceeds to step 406 where the fourth image is displayed on the display 102 of the camera device 100. By displaying the fourth image on the display of the camera device 100 a user can aim the camera device and target the first scene area for which the user wants to capture an image. In some embodiments, the fourth image is also stored in data/information 120 of memory 108. Processing then proceeds from step 406 to step 408.

In step 408, user input is received to control the capture of an image of the first scene area. The user input is received via input device 106 which may be, and in some embodiments is, a button or touch sensitive screen. For example, the user may touch a portion of the touch sensitive screen on which the fourth image is shown to focus the camera on a portion of the scene for which an image is to be captured. From step 408 processing proceeds to step 410 where the plurality of optical chain modules 130 are operated in parallel to capture images of the first scene area.

Step 410 includes sub-steps 412, 414, and optional sub-step 416. In sub-step 412, a first optical chain module is operated to capture a first image 418 of the first scene area using a first exposure time. In sub-step 414, a second optical chain module is operated to capture a second image 420 of the first scene area using a second exposure time, at least said first and said second exposure times being of different duration but overlapping in time. In some embodiments, an optional sub-step 416 is performed wherein a third optical chain module is operated to capture a third image 422 of the first scene area using a third exposure time. In some embodiments, the third exposure time is different than the first and second exposure times. Additional optical chain modules may be, and in some embodiments are, used to capture additional images of the first scene area with the additional optical chain modules using the same or different exposure times as the first, second or third exposure times so as to obtain additional image data for the first scene area. Sub-steps 412, 414, and optional sub-step 416 are performed in parallel so that multiple images of the first scene are captured in parallel with different exposure times. The first, second and optional third captured images may be, and in some embodiments are, stored in data/information 120 of memory section 108 to be available for later use such as for example in later steps of the method for generating a combined image of the first scene area, or for display or outputting of images.

In some embodiments, in step 404 the operation of one of the first, second and third optical chain modules to capture the fourth image of the first scene area uses a fourth exposure time different from said first, second and third exposure times. Once again step 404 occurs prior to the step 410 as the fourth image is displayed on the display 102 so the user can utilize the displayed image to target the scene area to be captured by the first, second and optional third images.

Operation of the method proceeds from step 410 to step 424. In step 424 the captured images, that is the first and second images, are processed to generate a first combined image of the first scene area 430. In those embodiments in which the optional third image was captured optional sub-step 428 is performed wherein the third image in addition to the first and second image is also processed to generate the first combined image of the scene area 430.

In some embodiments step 424 is accomplished using sub-step 426 wherein said processing of said first and second images and optionally said third image to generate a first combined image of the first scene area includes combining weighted pixel values of said first image, second image, and optional third image. The weighting of the pixel values may, and in some embodiments is a function of exposure times.

Thus, at least in some embodiments, a pixel value of the combined image is generated by weighting and summing a pixel value from each of the first, second and third images, where the pixel value from the first image is weighted according to the first exposure time used to capture the first image, the pixel value from the second image is weighted according the second exposure time used to capture the second image and the pixel value from the third image is weighted according to the third exposure time used to capture the third image.

Operation proceeds from step 424 to step 432. In step 432, the generated first combined image of the first scene area is stored in data/information 120 of memory 108 and/or displayed on the display 102, e.g., touch sensitive display of the camera device 100.

Operation proceeds from step 432 to step 404 where processing continues and the method is repeated.

In some embodiments of the present invention step 424 is performed on an external device such as a computer that is coupled to the camera device 100 via the transceiver interface 114. In such embodiments the first, second and optional third images are transmitted to the external device via the transceiver interface 114 where the step 424 is performed. Step 432 is then typically performed by the external device with the combined image 430 being stored in memory associated with the external device and/or displayed on a display associated with the external device.

Method 400 may be, and in some embodiments is, implemented on a variety of devices including for example, a camera or a mobile device such as a mobile cellular telephone or a tablet.

Figure 11:
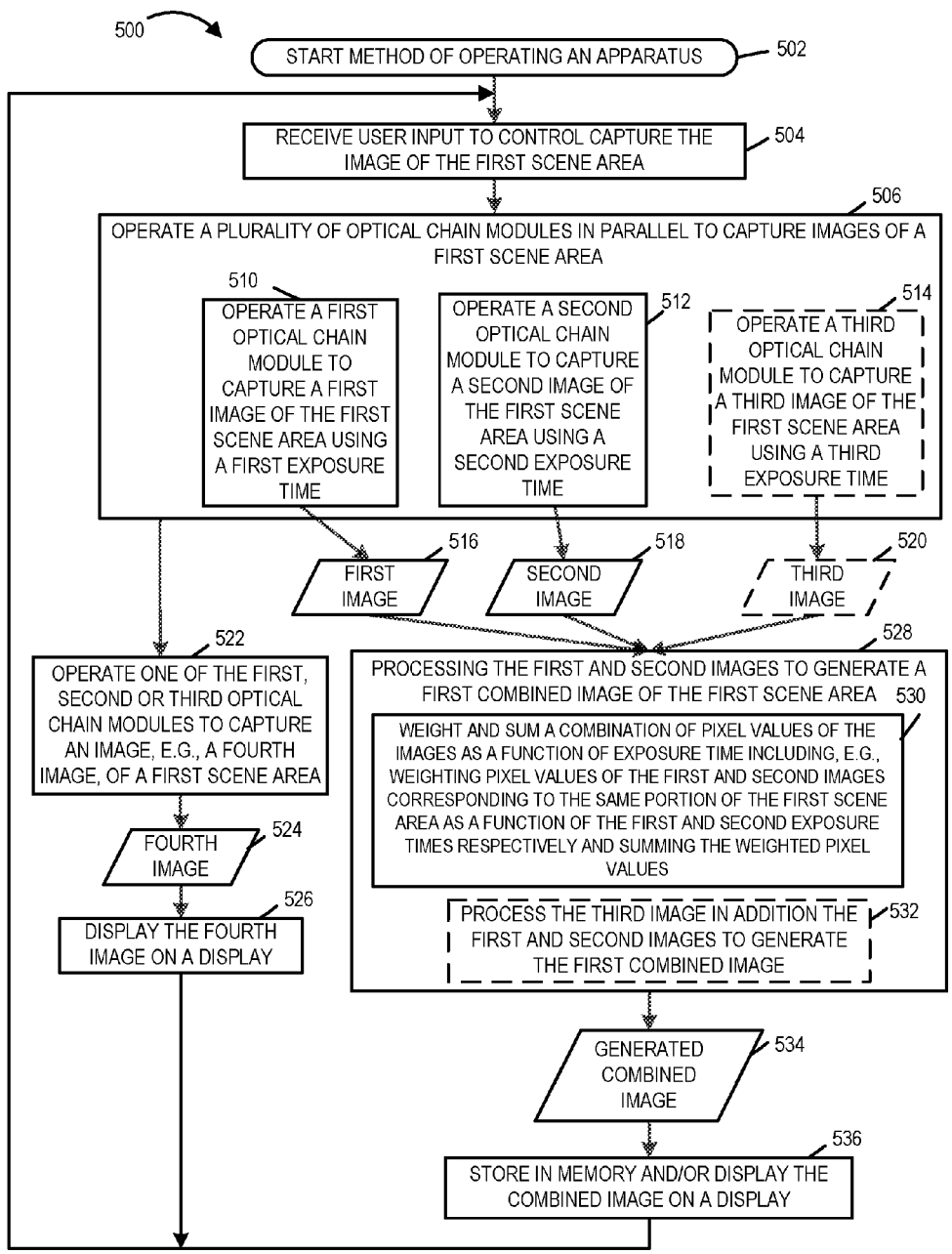
FIG. 11 illustrates an exemplary method of producing at least one image of a first scene area with enhanced sensor dynamic range by operating two or more optical chain modules in accordance with one embodiment of the present invention.

Method 500 of FIG. 11 illustrates an embodiment of a method of producing at least one image of a first scene area in accordance with the present invention. The method 500 achieves enhanced sensor dynamic range by combining images captured through the operation of two or more optical chain modules using different exposure times. The processing steps of the method 500 of FIG. 11 will now be explained in view of the camera device 100 of FIG. 1A. For ease of explanation of the method 500, it will be assumed that the plurality of optical chain module 130 of camera device 100 of FIG. 1A includes two optical chain modules and in some embodiments an optional third optical chain module which will be referred to as a first, second and third optical chain module respectively. Method 500 is similar to method 400 but implements the capture of the fourth image and display of the fourth image after the first, second and third images have been captured. In this way the user of the device is able to see on the display the first scene area that was captured in the first, second and optional third image and which will be processed to generate a combined image.

The method 500 of FIG. 11 starts at start step 502 with the start of the steps of the method being implemented, e.g., on processor 110. Operation proceeds from start step 502 to step 504. In step 504, user input is received to control the capture of the image of the first scene area. The user input is received via input device 106 which may be, and in some embodiments is, a button or touch sensitive screen. From step 504 processing proceeds to step 506 where the plurality of optical chain modules 130 are operated in parallel to capture images of the first scene area.

Step 506 includes sub-steps 510, 512, and optional sub-step 514. In sub-step 510, a first optical chain module is operated to capture a first image 516 of the first scene area using a first exposure time. In sub-step 512, a second optical chain module is operated to capture a second image 518 of the first scene area using a second exposure time, at least said first and said second exposure times being of different duration but overlapping in time. In some embodiments, an optional sub-step 514 is performed wherein a third optical chain module is operated to capture a third image 520 of the first scene area using a third exposure time. In some embodiments, the third exposure time is different than the first and second exposure times. Additional optical chain modules may be, and in some embodiments are, used to capture additional images of the first scene area with the additional optical chain modules using the same or different exposure times as the first, second or third exposure times so as to obtain additional image data for the first scene area and thereby enhancing the effective sensor dynamic range of the camera device. Sub-steps 510, 512, and optional sub-step 514 are performed in parallel so that multiple images of the first scene are captured in parallel with different exposure times. The first, second and optional third captured images may be, and in some embodiments are, stored in data/information 120 of memory section 108 to be available for later use such as for example in later steps of the method for generating a combined image of the first scene area, or for display or outputting of the images. Operation proceeds from step 506 to steps 522 and 528.

In step 522, one of said first, second and optional third optical chain modules is operated to capture a fourth image 524 of the first scene area after capturing one of said first, second and third images. While in this particular embodiment the fourth image is captured after the first, second and third images, in some embodiments one of the first, second and third images is used as the fourth image. In some embodiments a fourth exposure time different from said first, second and third exposure times is used to capture the fourth image 524. The fourth image may be, and in some embodiments is stored in data/information 120 of memory 108 for potential later use, output or display. Processing proceeds from step 522 to step 526. In step 526, the fourth image of the first scene area is displayed on display 102 of the camera device, e.g., a touch sensitive screen so that a user of the camera device can see an image of the first scene area that was captured by the first, second and optional third images. Processing proceeds from step 526 to step 504 where processing associated with the method continues as the method is repeated.

Returning to step 528, in step 528 the first and second images are processed to generate a first combined image of the first scene area 534. In those embodiments in which the optional third image was captured optional sub-step 532 is performed wherein the third image in addition to the first and second images is also processed to generate the first combined image of the scene area 534.

In some embodiments step 528 is accomplished using sub-step 530 wherein said processing of said first and second images and optionally said third image to generate a first combined image of the first scene area includes combining weighted pixel values of said first image, second image, and optional third image. The weighting of the pixel values may, and in some embodiments is a function of exposure times. Thus, at least in some embodiments, a pixel value of the combined image is generated by weighting and summing a pixel value from each of the first, second and third images, where the pixel value from the first image is weighted according to the first exposure time used to capture the first image, the pixel value from the second image is weighted according the second exposure time used to capture the second image and the pixel value from the third image is weighted according to the third exposure time used to capture the third image.

Operation proceeds from step 528 to step 536. In step 536, the generated first combined image of the first scene area is stored in data/information 120 of memory 108 and/or displayed on the display 102, e.g., the touch sensitive display of the camera device 100.

Operation proceeds from step 536 to step 504 where processing continues and the method is repeated.

In some embodiments of the present invention step 528 is performed on an external device such as a computer that is coupled to the camera device 100 via the transceiver interface 114. In such embodiments the first, second and optional third images are transmitted to the external device via the transceiver interface 114 where the step 528 is performed. Step 536 is then typically performed by the external device with the combined image 534 being stored in memory associated with the external device and/or displayed on a display associated with the external device.

Method 500 may be, and in some embodiments, is implemented on a variety of devices including for example, a camera or a mobile device such as a mobile cellular telephone or a tablet.

The use of an external computer to perform some or a part of the processing of the first, second and optional third images allows for the use of computational more complex algorithms as the external computer may be, and in some embodiments does have, a computationally more powerful processing capability than the camera device 100.

Figure 12:
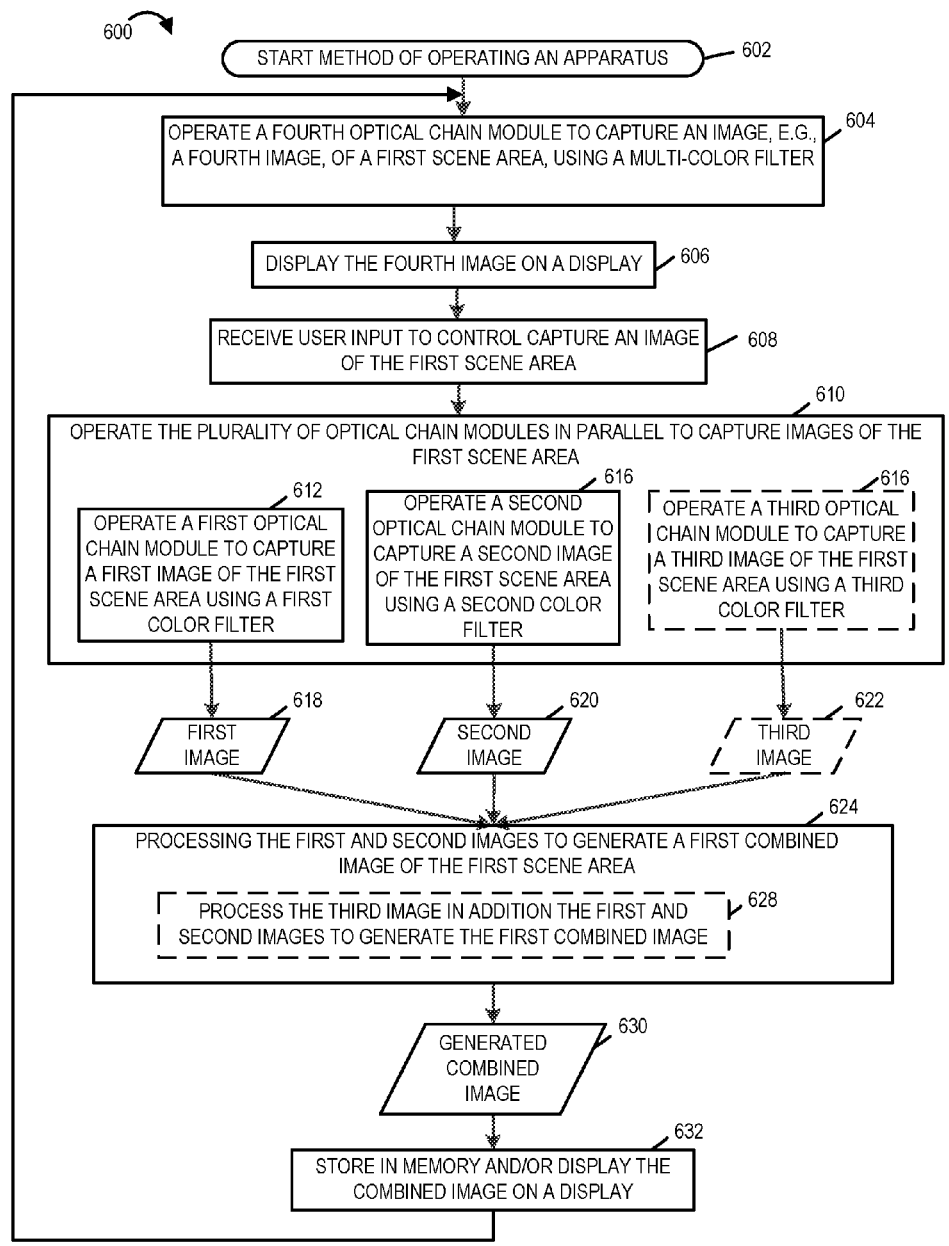
FIG. 12 illustrates an exemplary method of producing at least one image of a first scene area by operating two or more optical chain modules using color filters in accordance with one embodiment of the present invention.

Method 600 of FIG. 12 illustrates an embodiment of a method of producing at least one color image of a first scene area in accordance with the present invention. The method 600 uses color filters in connection with combining two or more images of a first scene area to obtain a color image of the first scene area. The processing steps of the method 600 of FIG. 12 will now be explained in view of the camera device 100 of FIG. 1A. For ease of explanation of the method 600, it will be assumed that the plurality of optical chain module 130 of camera device 100 of FIG. 1A includes two optical chain modules and in some embodiments an optional third and/or fourth optical chain module which will be referred to as a first, second, third and fourth optical chain module respectively.

The method 600 of FIG. 12 starts at start step 602 with the start of the steps of the method being implemented, e.g., on processor 110. Operation proceeds from start step 602 to step 604. In optional step 604, a fourth optical chain module of the camera device is operated to capture an image, e.g., a image referred to herein as a fourth image of a first scene area using a multi-color filter. This fourth image is captured prior to capturing the first, second or third images which will be discussed in connection with step 610 below.

Processing then proceeds to optional step 606 where the fourth image is displayed on the display 102 of the camera device 100. By displaying the fourth image on the display of the camera device 100 a user can aim the camera device and target the first scene area for which the user wants to capture an image. In some embodiments, the fourth image is also stored in data/information 120 of memory 108. Processing then proceeds from step 606 to step 608.

In step 608, user input is received to control the capture of an image of the first scene area. The user input is received via input device 106 which may be, and in some embodiments is, a button or touch sensitive screen. For example, the user may touch a portion of the touch sensitive screen on which the fourth image is shown to focus the camera on a portion of the scene for which an image is to be captured. From step 608 processing proceeds to step 610 where the plurality of optical chain modules 130 are operated in parallel to capture images of the first scene area.

Step 610 includes sub-steps 612, 614, and optional sub-step 616. In sub-step 612, a first optical chain module is operated to capture a first image 618 of the first scene area using a first color filter. In sub-step 614, a second optical chain module is operated to capture a second image 620 of the first scene area using a second color filter, said first and said second color filters corresponding to a first color and a second color respectively. Said first and said second colors being different colors. In some embodiments, said first and second color filters are single color filters which correspond to said first and second colors, respectively. In some embodiments, an optional sub-step 616 is performed wherein a third optical chain module is operated to capture a third image 622 of the first scene area using a third color filter. In some embodiments, the third color filter corresponds to a color that is different from said first and second colors. In some embodiments the third color filter is a single color filter which corresponds to said third color. Additional optical chain modules may be, and in some embodiments are, used to capture additional images of the first scene area with the additional optical chain modules using the same or different color filters as the first, second or third color filters so as to obtain additional image data for the first scene area. Sub-steps 612, 614, and optional sub-step 616 are performed in parallel so that multiple images of the first scene area are captured in parallel with different color filters. The first, second and optional third captured images may be, and in some embodiments are, stored in data/information 120 of memory section 108 to be available for later use such as for example in later steps of the method for generating a combined image of the first scene area, or for display or outputting of images. In some embodiments of the present invention, the first optical chain module includes a first lens and a first image sensor and the second optical module includes a second lens and a second image sensor and the optional third optical chain module includes a third lens and a third image sensor. In some embodiments, said first and said second image sensors are of the same resolution. In some embodiments of the present invention, said optional third image sensor of said third optical chain module has the same resolution as the first and second image sensors. In some embodiments of the present invention, the fourth optical chain module includes a fourth lens and a fourth image sensor. In some embodiments of the present invention the fourth image sensor is of the same resolution as the first and second image sensor. In some embodiments of the present invention, the first, second and third lenses of the first, second and third optical chain modules are arranged in a circle, and the fourth lens of the fourth optical chain is arranged in the center of the circle.

Operation of the method proceeds from step 610 to step 624. In step 624 the captured images, that is the first and second images, are processed to generate a first combined image of the first scene area 630. In those embodiments in which the optional third image was captured optional sub-step 628 is performed wherein the third image in addition to the first and second images is also processed to generate the first combined image of the scene area 630. In some embodiments the fourth image of the first scene area is also processed with the first, second and third images to generate the first combined image of the first scene area.

Operation proceeds from step 624 to step 632. In step 632, the generated first combined image of the first scene area is stored in data/information 120 of memory 108 and/or displayed on the display 102, e.g., a touch sensitive display of the camera device 100.

Operation proceeds from step 632 to step 604 where processing continues and the method is repeated.

In some embodiments of the present invention step 624 is performed on an external device such as a computer that is coupled to the camera device 100 via the transceiver interface 114. In such embodiments the first, second and optional third images are transmitted to the external device via the transceiver interface 114 where the step 624 is performed. Step 632 is then typically performed by the external device with the combined image 630 being stored in memory associated with the external device and/or displayed on a display associated with the external device.

Method 600 may be, and in some embodiments, is implemented on a variety of devices including for example, a camera or a mobile device such as a mobile cellular telephone or a tablet.

In some embodiments of the present invention, each image is presented as it is captured on the display or in the case of a combined image when said image has been generated.

In some embodiments of the present invention, each of the captured images, e.g., the first, second, third, and fourth images may be, and is, displayed on the display 102 of the camera device 100 as it is captured along with one or more combined images that are formed by processing and/or combining the first, second, third and/or fourth images. In some embodiments of the present invention, each of the images may be, is shown, in a separate portion of the display with the size of the image being adjusted so that each image displayed is shown in its entirety. In some embodiments of the present invention, a caption is automatically placed under each image as it displayed on the screen. In some embodiments of the present invention, the caption includes the number of the image or an indication that it is a combined image, e.g., image 1, image 2, image 3, image 4, combined image from image 1, 2, 3, and 4. In some embodiments of the present invention, each image is presented as it is captured on the display or in the case of a combined image when said image has been generated. The images may be arranged in a variety of ways on the display 102 after capture and the aforementioned embodiments are only meant to be exemplary in nature.

In some embodiments of the present invention, the image generated by combining the images captured from two or more of the optical chain modules is displayed for targeting purposes so that the user may provide input to control the capture of the image of the scene area and/or the object in the scene upon which the combined image should be focused.

Figure 13:
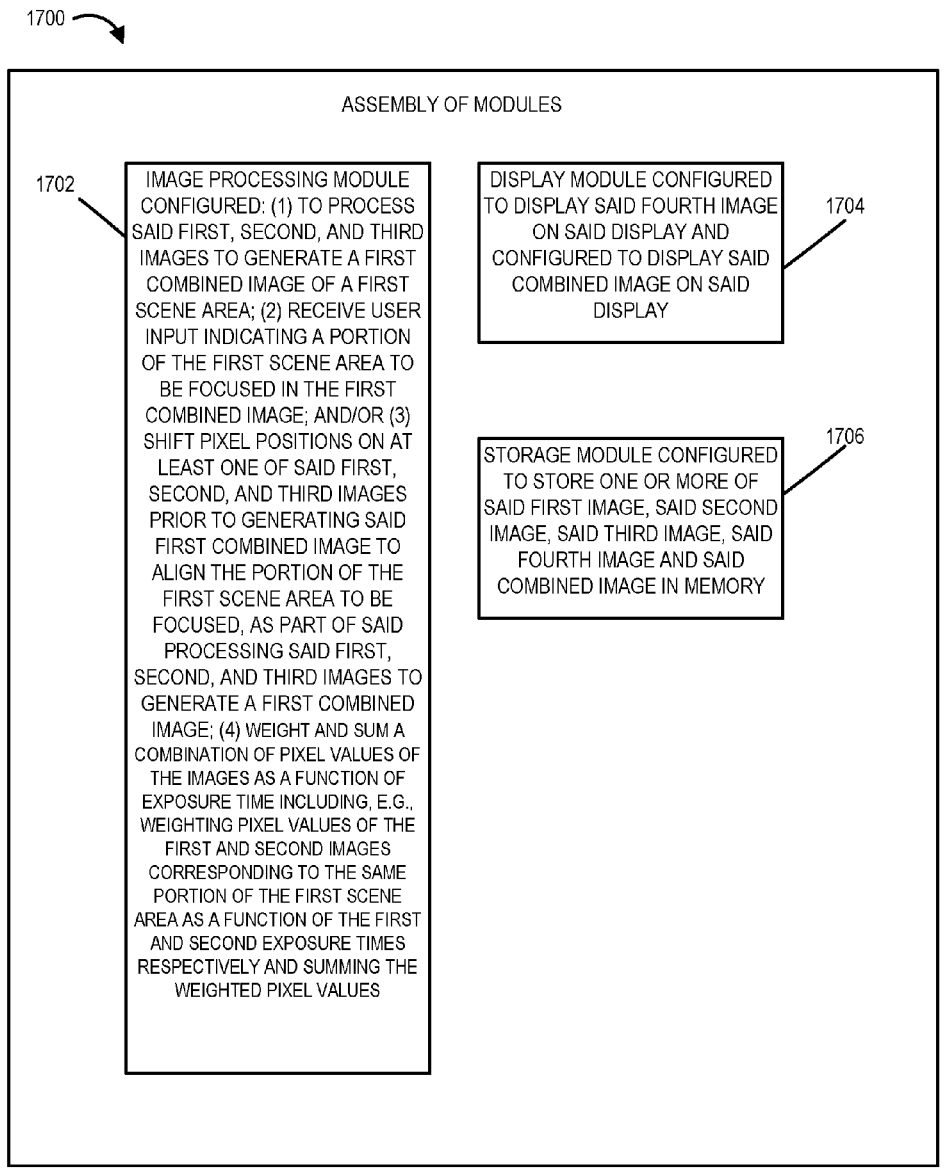
FIG. 13 illustrates an exemplary assembly of modules, which may, and in some embodiments is, part of an apparatus which implements one or more methods of the invention, for performing various image and data processing functions in accordance with one or more exemplary embodiments of the invention.

The FIG. 13 assembly of modules 1700 may, and in some embodiments is, used to process data for example first, second, third and fourth images and associated data, and storing and displaying images. In the FIG. 13 example, the assembly of modules includes a image processing module 1702, a display module 1704, and a storage module 1706. The modules implemented one or more of the previously discussed image processing steps and may include a variety of sub-modules, e.g., an individual circuit, for performing an individual step of method or methods being implemented.

Figure 14:
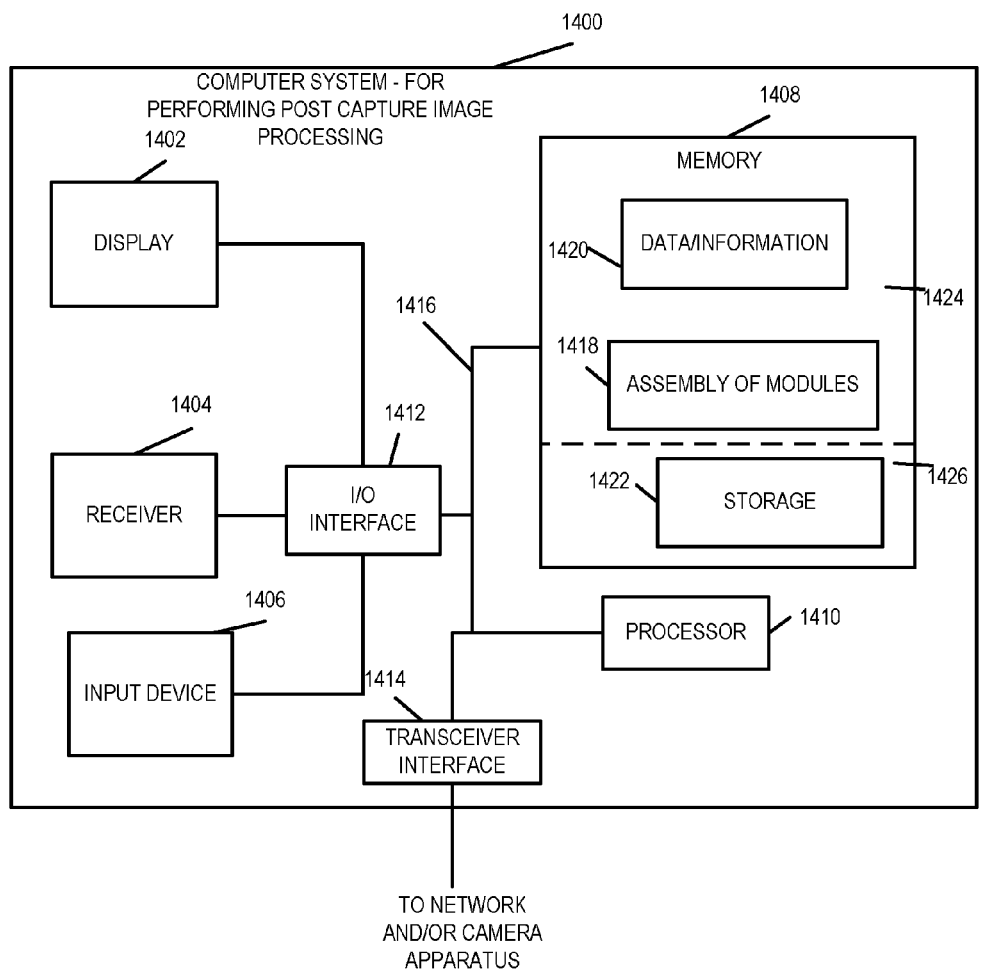
FIG. 14 illustrates a computer system which can be used for post processing of images captured using a camera device.

FIG. 14 illustrates a computer system which can be used for post processing of images captured using a camera device. The computer system 1400 includes a display 1402, Input/Output (I/O) interface 1412, receiver 1404, input device 1406, transceiver interface 1414, processor 1410 and memory 1408. The memory is coupled to the processor 1410, I/O interface 1412 and transceiver interface 1414 via bus 1416 through which the elements of the computer system 1400 can exchange data and can communicate with other devices via the I/O interface 1412 and/or interface 1414 which can couple the system 1400 to a network and/or camera apparatus. It should be appreciated that via interface 1414 image data can be loaded on to the computer system 1400 and subject to processing, e.g., post capture processing. The images may be stored in the data/information portion 1420 of memory 1408 for processing. The assembly of modules 1418 includes one or more modules or routines which, when executed by the processor 1410, control the computer system to implement one or more of the image processing operations described in the present application. The output of multiple optical receiver chains can be, and in some embodiments is, combined to generate one or more images. The resulting images are stored in the data portion of the memory 1408 prior to being output via the network interface 1414, though another interface, or displayed on the display 1402. Thus, via the display 1402 a user can view image data corresponding to one or more individual optical chain modules as well as the result, e.g., image, generated by combining the images captured by one or optical chain modules.

Figure 15:
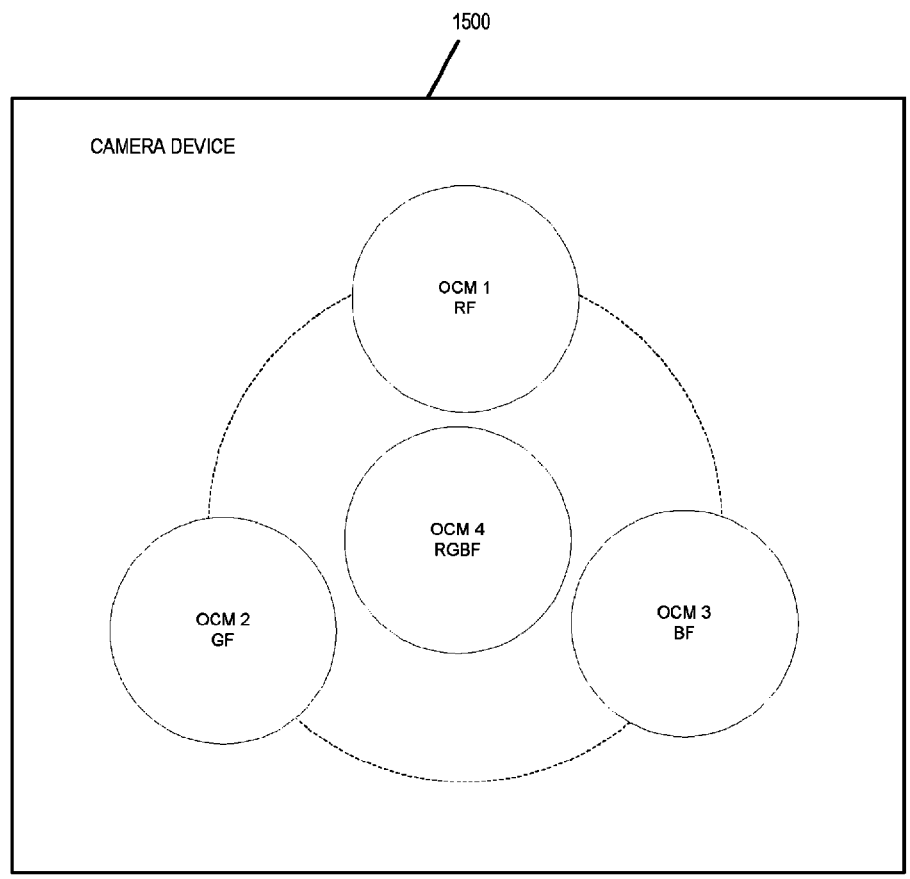
FIG. 15 illustrates a frontal view of an apparatus implemented in accordance with one embodiment of the present invention which incorporates multiple optical chain modules, e.g., one for each of red, green and blue and one for all three colors.

FIG. 15 illustrates a frontal view of an apparatus implemented in accordance with one embodiment of the present invention which incorporates multiple optical chain modules. Camera device 1500 includes four optical chains OCM 1, OCM2, OCM 3 and OCM 4. The outer lens of OCM 1, OCM 2, OCM 3 and OCM 4 being shown as circles with a frontal view. OCM1 including a red filter element, OCM 2 including a green filter element, OCM 3 including a blue filter element. Optical chain module 4 passes all three colors and includes a sensor with a multi-color filter element, e.g., a Bayer filter. The optical chain modules may be the same as or similar to those previously described in FIGS. 1-3.

Figure 16:
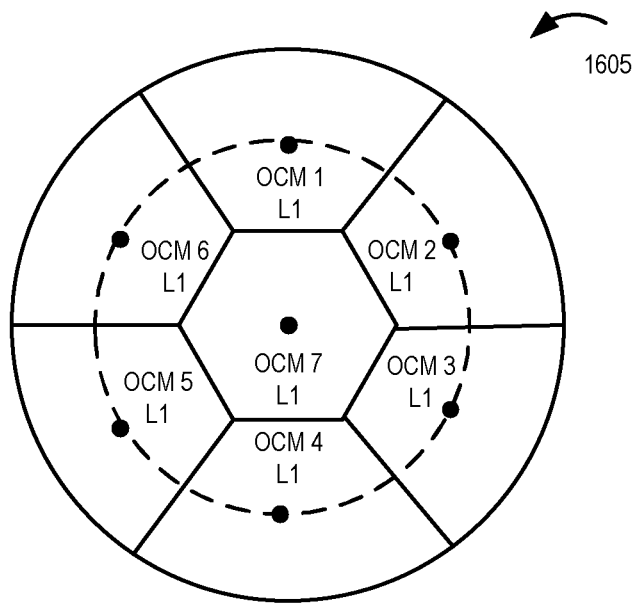
FIG. 16 illustrates a frontal view of the outer lens assembly of an apparatus implemented in accordance with one embodiment of the present invention where the apparatus incorporates multiple optical chain modules and outer lenses configured with little or no gaps between the lenses.
Figure 17:
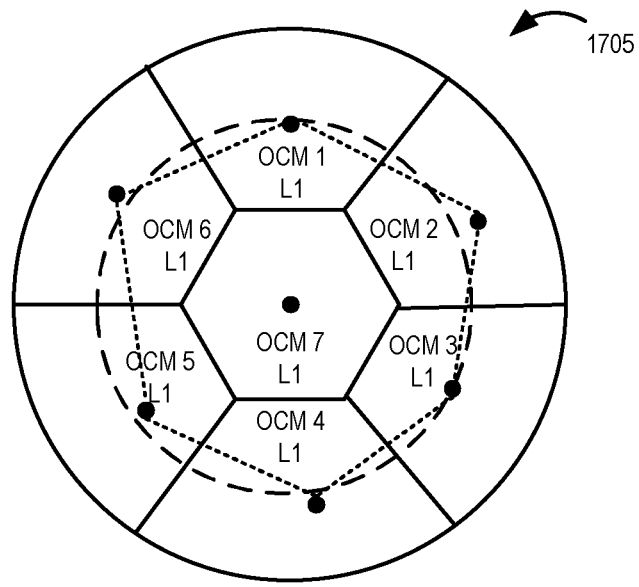
FIG. 17 illustrates a frontal view of the outer lenses of a lens assembly implemented in accordance with one embodiment of the present invention where the apparatus incorporates multiple optical chain modules with lenses configured with little or no gaps between the lenses but non-uniform spacing between the optical centers of at least some of the lenses.

FIG. 16 illustrates a frontal view of the outer lenses of an apparatus 1605 implemented in accordance with one embodiment of the present invention which incorporates multiple optical chain modules and which is designed to have little or no gaps between the outer most lenses of the different optical chain modules. The outer most lenses may be the aperture stop lenses in the FIG. 16 embodiment. Apparatus 1605 of FIG. 16 includes 7 optical chain modules OCM1, OCM2, OCM3, OCM4, OCM5, OCM6 and OCM7 with the outer lens plane corresponding to lenses L1 as viewed from the front of the camera device being shown in FIG. 16. The outer lenses L1 of optical chain modules 1, 2, 3, 4, 5, and 6 are positioned so as to surround the outer lens L1 of the optical chain module 7. The outer lens L1 of the optical chain module 7 being formed in the shape of a hexagon, i.e., a six sided polygon. The outer lenses L1 of optical chain modules 1, 2, 3, 4, 5 and 6 being of same shape and size and when combined with lens L1 of optical module 7 forming a circle. The optical center of each lens L1 of optical chain modules shown as a dark solid dot on the dashed circle. The optical center of lens L1 of optical chain module 7 shown as a dot in the center of the hexagon and also in center of the dashed line. A block separator or other light block may be used between the lenses to stop light leakage between the different lenses. The dots in FIGS. 16 and 17 represent the optical center of the individual lenses. In some embodiments each outermost lens is a round convex lens with its parameter cut to the shape shown in FIG. 16 so that the lenses fight closely together. The little or no gap between the front lenses, e.g., the total area of the gap between the lenses occupies less than 5% of the total area of the front area of the lens assembly, e.g., circle shown in FIG. 16, occupied by the lenses when assembled together. The lack of or small size of the gaps facilitates generating combined images with a desirable bokehs or blurs in the combined image with regard to image portions which are out of focus, e.g., in some cases without the need for extensive and potentially complex processing to generate the combined image.

FIG. 17 illustrates a frontal view of the outer lenses of an apparatus 1705 implemented in accordance with one embodiment of the present invention which incorporates multiple optical chain modules and outer lenses, e.g., the aperture stop lens for each of the corresponding optical chains, arranged to have non-uniform spacing between the optical centers of the lenses. Thus the FIG. 17 embodiment is similar to the FIG. 16 embodiment but with non-uniform spacing of the optical centers of lenses along the outer parameter of the lens assembly. The non-uniform spacing facilitates depth of field determinations particularly when performing block processing and the entire field of view may not be under consideration when processing a block or sub-portion of the captured field of view. The optical chain modules shown in FIGS. 16 and 17 are the same or similar to those previously described with reference to FIG. 3 but differ in terms of lens shape, size and/or configuration.

Figure 18:
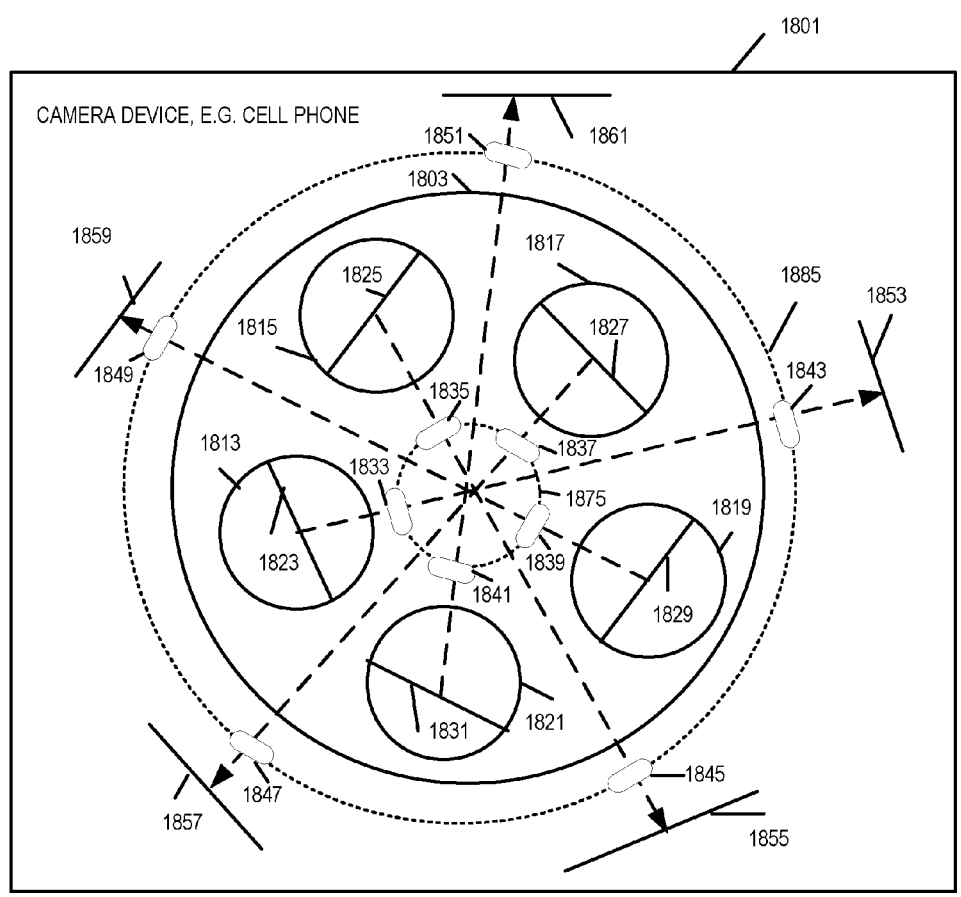
FIG. 18 illustrates a camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.

FIG. 18 illustrates another exemplary camera device 1801 including a plurality of first through fifth optical chain modules each of which includes an outer lens 1813, 1818, 1817, 1819, or 1821 represented as a circle on the outer lens platter 1803. Rather than being circular lenses, elements 1813, 1818, 1817, 1819, or 1821 could be simple empty apertures that let in light or might be a clear protective surface through which light can pass such as flat glass, plastic, or a filter. Elements 1813, 1818, 1817, 1819, or 1821 may be followed by a fold element such as a mirror, which is then followed by lenses, filters, etc. Filter and/or lens position may vary depending on the embodiment.

Figure 19:
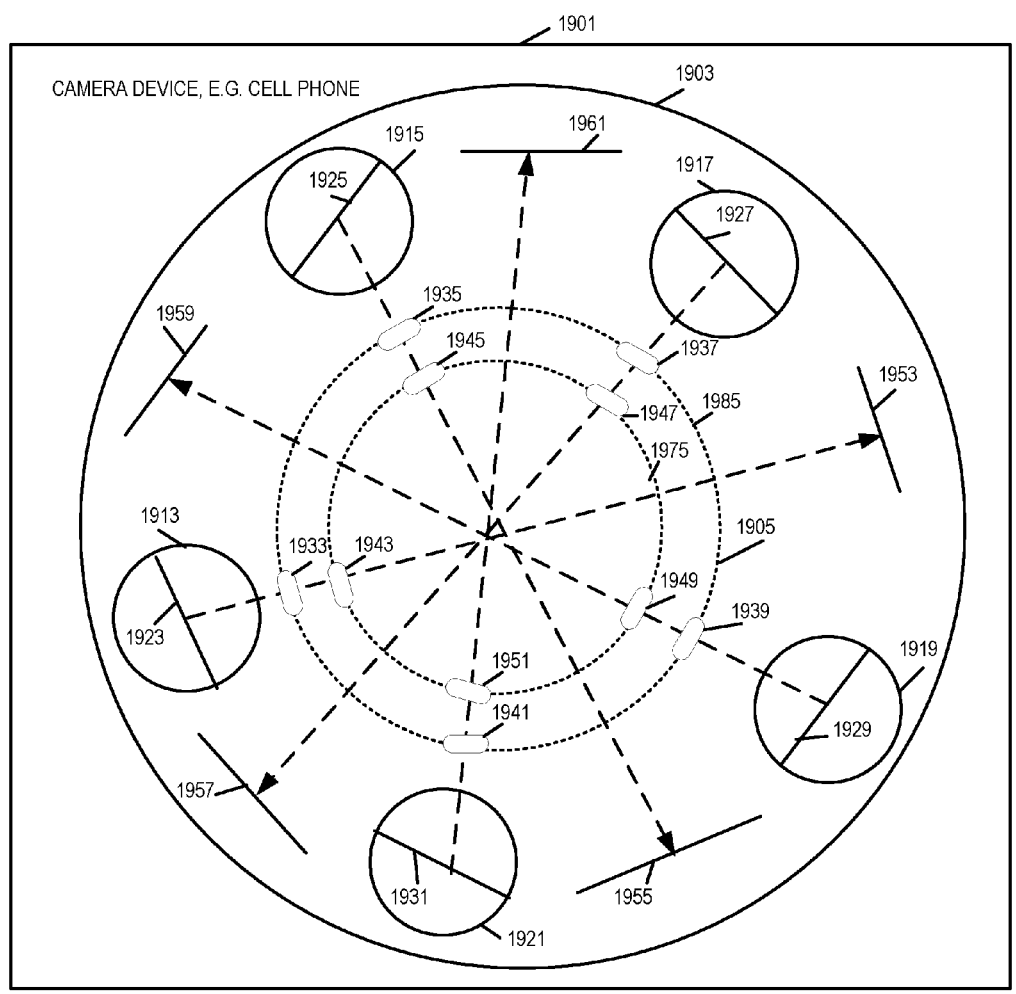
FIG. 19 illustrates another camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.

In both FIGS. 18 and 19 arrows made of dashed lines represent the path of light for the corresponding optical chain module after light which entered the outer lens along the optical axis of the outer lens is redirected by the mirror or other light redirection device. Thus, the arrows represents the direction and general light path towards the sensor of the optical chain to which the arrow corresponds.

In the FIG. 18 embodiment each of the optical chain modules includes, in addition to an outer lens 1813, 1815, 1817, 1819, or 1821, a mirror or other device, e.g., prism, 1823, 1825, 1827, 1829, or 1831 for changing the angle of light received via the corresponding outer lens. Additionally, as in some of the previously described embodiments such as the FIGS. 1A, 1B, 1C and 3 embodiments, each camera module includes a filter 1833, 1835, 1837, 1839, or 1841 and an inner lens 1843, 1845, 1847, 1849, or 1851. In addition each optical chain module includes a sensor 1853, 1855, 1857, 1859, or 1861. For example, the first optical chain module include outer lens 1813, mirror 1823, filter 1833, inner lens 1843 and sensor 1853.

Filters 1833, 1835, 1837, 1839, or 1841 are mounted on a movable cylinder 1875 represented as a circle shown using small dashed lines. The cylinder 1875 may be rotated and/or moved forward or backward allowing lenses and/or filters on the cylinder to be easily replaced with other lenses, filter, or holes mounted on the cylinder 1875. While in the FIG. 18 example, an exit hole is provided to allow light to exit cylinder 1875 after passing through one of the filters 1833, 1835, 1837, 1839, or 1841 it should be appreciated that rather than an exit hole another lens or filter may be mounted on the cylinder 1875 allowing two opportunities for the light to be filtered and/or passed through a lens as is passes through the cylinder 1875. Thus, in at least some embodiments a second filter or lens which is not shown in FIG. 18 for simplicity is included at the exit point for the light as it passes through cylinder 1804. Inner lenses are mounted on cylinder 1885 which is actually closer to the outside sidewalls of the camera device 1801 than the filters mounted on cylinder 1875. Given the large diameter of movable cylinder 1885 and the relatively small diameter of the light beam as it nears the sensor, it should be appreciated that a large number of alternative filters, lenses and/or holes can be mounded on cylinder 1885. As with cylinder 1875 the light can be filtered and/or processed by a lens as it enters and leaves cylinder 1885 prior to reaching the sensor of the corresponding optical chain.

In some embodiments lenses mounted on a moveable platter positioned between the outer lens platter 1803 and mirrors which may, and in some embodiments are, also mounted on a platter are used to support autofocus. In such an embodiment the lens platter between the outer lens platter and mirror platter is moved in or out to perform focus operations for each of the optical chain modules in parallel. In another embodiment, different sets of lens are mounted on the drum 1885 or 1875 with different lens sets being mounted with a different offset distance from the surface of the drum. By switching between the different sets of lenses by rotating the drum on which the different lens sets are mounted, focusing between different predetermined focus set points can, and in some embodiments is achieved, by simply rotating the drum on which the lens sets, corresponding to the different focal distance set points, are mounted.

Notably, the FIG. 18 embodiment, by changing the direction of light through the use of mirrors, prisms and/or other devices allows for the length of the individual optical chains to be longer than the camera device is thick. That is, the side to side length of the camera device 1801 can be used in combination with a portion of the front to back length to create optical chains having a length longer than the depth of the camera device 1801. The longer optical chain length allows for more lenses and/or filters to be used as compared to what may be possible with shorter optical chain lengths. Furthermore, the change in the direction of light allows for the use of cylinders for mounting lenses, filters and/or holes which can be easily interchanged by a simple rotation or axial, e.g., front to back movement, of the cylinder on which the lenses, filters and/or holes corresponding to multiple optical chains are mounted.

In the FIG. 17 embodiment sensors may be fixed and/or mounted on a movable cylinder. Thus, not only can the lenses, filters and/or holes be easily switched, changes between sensors or sets of sensor can be easily made by rotating the cylinder on which the sensors are mounted. While a single mirror is shown in FIG. 18 in each optical chain module, additional mirrors may be used to further extend the length of the optical path by reflecting in yet another direction within the housing of the camera device 1801.

It should be appreciated that the FIG. 18 embodiment allows for a combination of lens, filter, and/or hole mounting platters arranged parallel with the platter extending left to right within the camera device and cylinders arranged so that the top and bottom of the cylinder extend in the front to back direction with respect to the camera body, e.g., with the front of the camera being shown in FIG. 18. Cylinders may be mounted inside of one another providing a large number of opportunities to mount lens, filters and/or holes along the optical paths of each optical chain module and allowing for a large number of possible filter/lens/sensor combinations to be supported, e.g., by allowing for different combinations of cylinder positions for different modes of operation.

While changing sensors mounted on a cylinder can be achieved by rotating a cylinder, in the earlier embodiments in which sensors may be mounted on platters, sensors may be changed by rotating or otherwise moving a platter on which the sensors are mounted.

Note that in the FIG. 18 embodiment the outer lenses of the optical chain modules are mounted near the center of the front of the camera device 1801 as shown, e.g., forming a generally circular pattern of outer lenses 1813, 1815, 1817, 1819, 1821.

In some embodiments, rather than lenses elements 1813, 1815, 1817, 1819, 1821 could be implemented as apertures, e.g., openings, that let in light. Alternatively, flat glass or another material could be used as elements 1813, 1815, 1817, 1819, 1821 to keep direct out of the camera. The lens, aperture, or clear material 1813, 1815, 1817, 1819, 1821 may be followed by a fold element or other light redirection element such as a mirror, which is then followed by lenses, filters, etc. In some systems the ordering in an optical chain is: hole or protective cover, mirror, lens or lenses, filter and then sensor. However, other configurations are possible. For example the filter position can be placed at a variety of locations depending on the implementation, including right up front before or after the mirror or light redirection device or between lenses.

FIG. 19 is similar to the FIG. 18 embodiment in that it illustrates another camera device 1901 including a plurality of optical chain modules which include mirrors or another device for changing the angle of light entering the optical chain module and thereby allowing at least a portion of the optical chain module to extend in a direction, e.g., a perpendicular direction, which is not a straight front to back direction with respect to the camera device. FIG. 19 differs from the FIG. 18 embodiment in that the outer lenses of the first through fifth optical chain modules are positioned near the perimeter of the face of the camera device 1901. This allows for the length of the optical chain module to be longer than the length of the optical chains shown in FIG. 18. FIG. 19 shows outer and inner cylinders, also some times referred to as drums, 1975, 1985, upon which filters, lenses and holes can and in various embodiments are mounted as discussed with regard to the FIG. 18 embodiment. Thus cylinders 1975 and 1985 server the same or similar purpose served by cylinders 1875, 1885, respectively. It should be appreciated that in some embodiments the FIG. 19 embodiment includes filters and lenses mounted on the inner and outer cylinders in the same or similar manner as filters and lenses are mounted on the cylinders 1875, 1885 shown in FIG. 18.

Elements of the FIG. 19 embodiment which are the same or similar to the elements of the FIG. 18 embodiment are identified beginning with "19" instead of "18" and for the sake of brevity will not be described again in detail. For example element 1961 is used to refer to the sensor for the optical chain module which includes outer lens 1921, mirror/light redirection device 1931, filter 1941 and inner lens 1951. The cylinder 1975 is used to mount the filters while cylinder 1985 is used to mount the inner lenses.

The camera devices 1801 and 1901 may, and in some embodiments do, include a processor, display and/or other components of the camera device shown in FIG. 1A but such elements are not explicitly shown in the FIGS. 18 and 19 embodiments to avoid complicating the figures and being repetitive.

Various functions of the present invention may be and are implemented as modules in some embodiments. The assembly of modules 1700 shown in FIG. 13 illustrates an exemplary assembly of modules, e.g., software or hardware modules, that may be and are used for performing various functions of a image processing system or apparatus used to process images in accordance with embodiments of the present invention. When the modules identified in FIG. 13 are implemented as software modules they may be, and in some embodiments of the present invention are, stored in memory 108 of FIG. 1A in the section of memory identified as assembly of modules 118. These modules may be implemented instead as hardware modules, e.g., circuits.

The ideas and concepts described with regard to various embodiments such as those shown in FIG. 19 can be extended so that the input sensors can be located in a plane, e.g., at the back of the camera device and/or at the front of the camera device. In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

Figure 20:
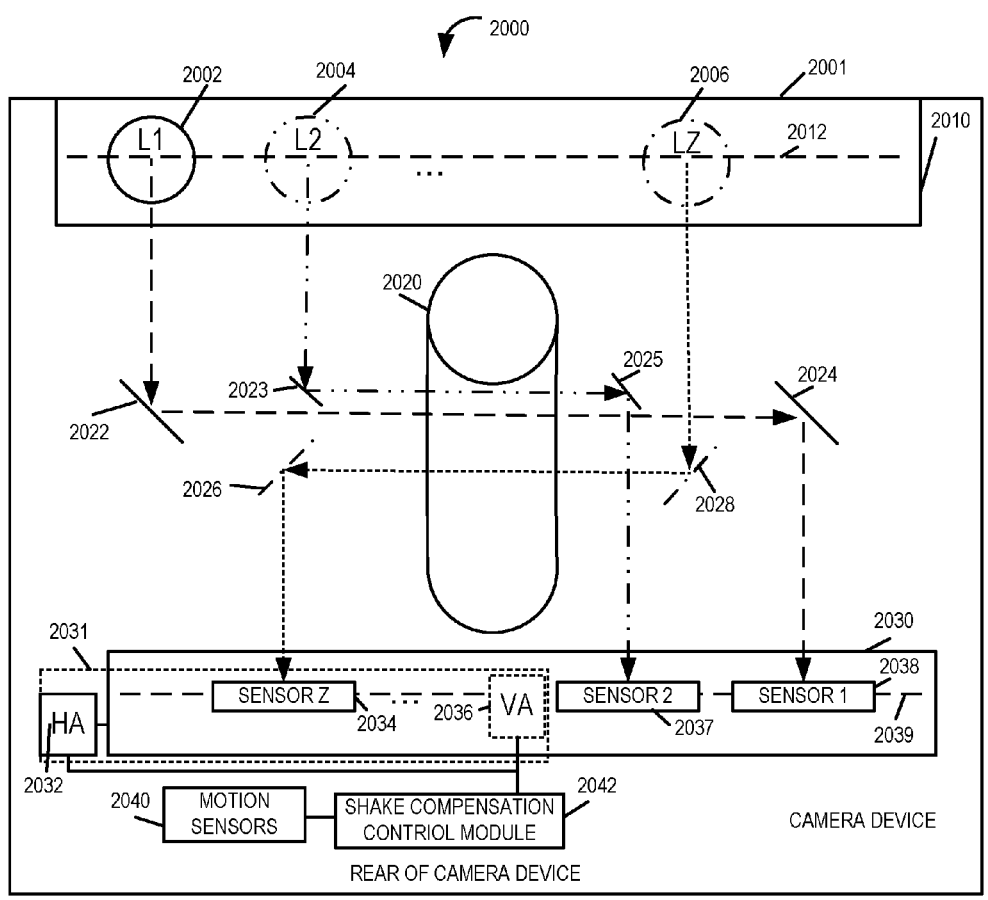
FIG. 20 illustrates an additional exemplary camera device in which mirrors and/or other light redirecting elements are used to alter the path of light in the optical chains so that both the input lenses and/or openings through which light enters the optical chains can be arranged in a plane, and also so that the optical sensors of the optical chains can be arranged in a plane, while allowing at least a portion of the light path through the optical chains to extend in a direction perpendicular to the input and/or output planes.
Figure 21:
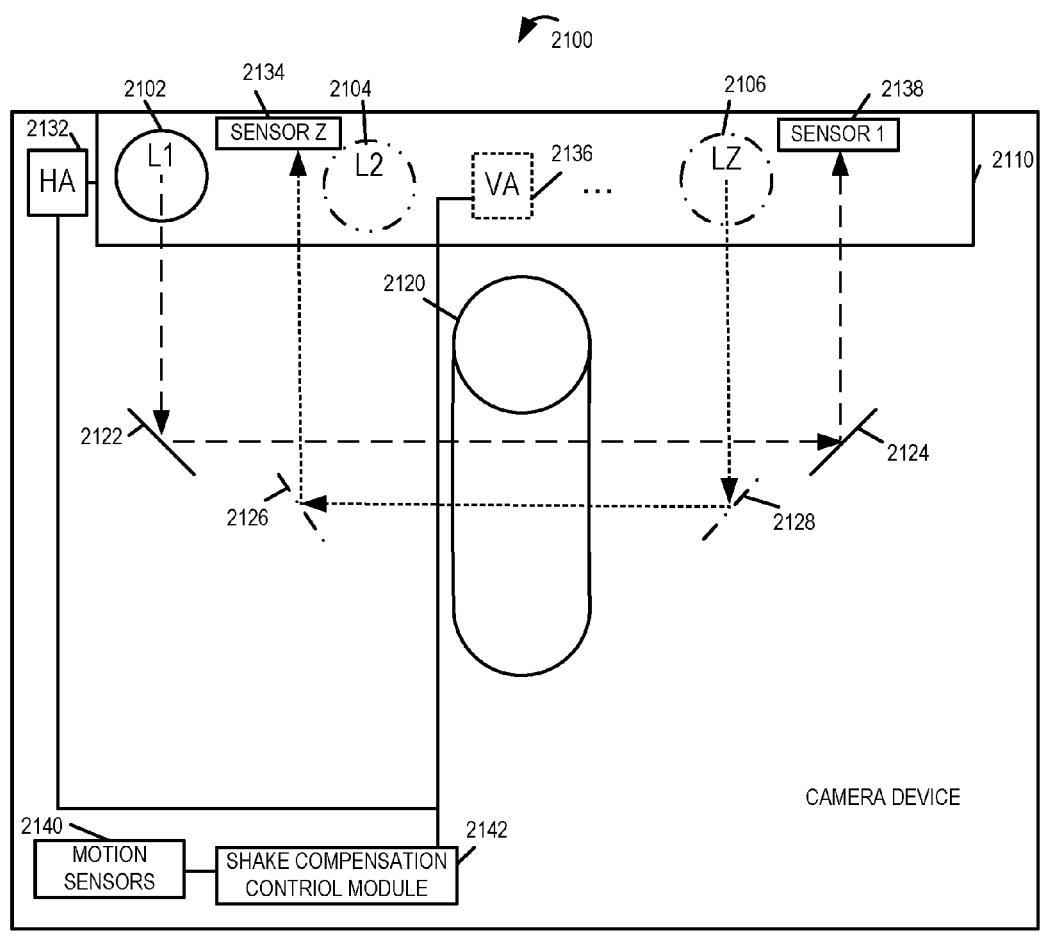
FIG. 21 illustrates an additional exemplary camera device in which mirrors and/or other light redirecting elements are used to alter the path of light in the optical chains so that the input lenses and/or openings, as well as the light sensors of the different optical chains, can be arranged in one or more planes at the front of the camera.

In the FIGS. 20 and 21 embodiments two or more deflection elements are used in each optical chain. Mirrors are exemplary deflection elements that may and sometimes are used in the FIGS. 20 and 21 embodiments. Prisms are examples of deflection elements which may, and in some embodiments are, used in place of mirrors. Thus, at least in some embodiments each optical chain includes multiple deflection elements in the form of mirrors. Deflection elements alter the path of light and, while implemented as mirrors and prisms in some embodiments, may also be implemented using other devices, e.g., optic elements, which can alter the path of light. The deflection element may be implemented as a folded optic element, folding element, beam guiding element, reflector, wave guiding element. Thus, it should be appreciated that a deflection element can take a wider variety of forms and may be implemented as a mirror, beam splitter, prism, that can, and in some embodiments is, used to bend or fold the optical path of an optical chain or light beam passing through an optical chain. In FIGS. 20 and 21 embodiments two deflection elements are used in each optical chain. In one particular embodiment the deflection elements are implemented as mirrors which, deflect light 90 degrees or substantially 90. However, the deflection elements need not be of the same type, for example one deflection element may be a mirror and another deflection element may be a prism. Furthermore while 90 degrees is used in some embodiments other amounts of deflection may be used in other embodiments.

FIG. 20 illustrates an exemplary diagram of a camera device 2000 implemented in accordance with one exemplary embodiment of the invention. The FIG. 20 diagram is intended for explanation purposes to facilitate an understanding of various features and thus is not a precise view of the camera device as perceived from the top but a functional diagram of the elements from a top view perspective which is intended to convey various aspects of the optical chain configurations used in the device 2000. The top portion of FIG. 20 corresponds to the front of the camera device 2000 while the bottom portion corresponds to the back of the camera device 2000. The body 2001 of the camera extends from left to right with the lens and/or openings 2002, 2004, 20006 corresponding to multiple optical chains being mounted in front of the camera device 2000. A LCD or other display (not shown) may and in some embodiments is, located at the rear of the camera device 2000.

In the camera device 2000 includes a plurality of lens or openings L1 through LZ (L1 2002, L2 2004, . . . , LZ 2006) each corresponding to a different one of Z optical chains. Note that in FIG. 20 the lenses 2002, 2004, . . . , 2006 are loaded in a plane represented by dashed line 2012 which extends down towards the bottom of the camera device 2000 which is not visible in the FIG. 20 diagram. The lenses 2002, 2004, . . . , 2006 may be arranged in a circular or other pattern on the front of the camera device 2000. Each optical chain in the FIG. 20 embodiment includes multiple mirrors or other light redirecting devices, e.g., prisms, and a sensor positioned at the end of the optical chain. For example, optical chain 1 includes lens L1 2002, first deflection element 2022, e.g., a mirror or prism, second deflection element 2024, e.g., a mirror or prism, and sensor 1 2038. Optical chain 3 includes lens L2 2004, first deflection element 2023, e.g., a mirror or prism, second deflection element 2025, e.g., a mirror or prism, and sensor 2 2037. Optical chain Z includes lens LZ 2006, first deflection element 2028, e.g., a mirror or prism, second deflection element 2026, e.g., a mirror or prism, and sensor Z 2034. It should be appreciated that deflection elements, e.g., mirrors and/or prisms, of the first and second optical chains are located around the cylinder 2020 on which one or more lenses or filters may be mounted as discussed with regard to the other embodiments. The deflection elements, e.g., mirrors and/or prisms, may be arranged in a plane positioned parallel to the input plane 2012 with the light of the different optical chains passing each other, e.g., crossing, within the cylinder 2020. While a single cylinder 2020 is shown in FIG. 20, multiple cylinders, lenses and/or filters may, and in some embodiments are, used as discussed with regard to the other embodiments. Note that in the FIG. 20 embodiment the deflection elements, e.g., mirrors and/or prisms, (2022, 2024), (2023, 2025), (2028, 2026) redirect the light passing through the optical chain to which the deflection elements, e.g., mirrors and/or prisms, correspond so that at least a portion of the optical path of the optical chain extends perpendicular or generally perpendicular to the input direction in which the input lenses L1, L2, LZ face and parallel to the input plane 2012. The input plane may be implemented as a mounting device, e.g., circuit board, upon one or more input lenses or openings L1, L2, LZ are mounted or included in. This allows the optical chain to take advantage of the left to right width of a camera permitting an overall optical chain length than would be possible if the optical chain was limited to the front to back depth of camera device 2000. This allows for thin cameras with relatively long optical chains. Notably, the use of two 45 degree mirrors in an optical chain, e.g., mirror 2022 and mirror 2024 in optical chain 1; mirror 2023 and mirror 2025 in optical chain 2; and mirror 2028 and mirror 2026 in optical chain Z, allows the sensors (2038, 2037, 2034) of the optical chains to be mounted in a backplane 2030 with the sensors being arranged on the backplane 2030 in a plane, as indicated by dashed line 2039, which is parallel to the input plane 2012. In some embodiments, there are different sensor planes corresponding to different optical chains, and the sensor planes of the different optical chains are parallel to one another. The ability to mount the sensors (2038, 2037, . . . , 2034) on a single backplane 2030 allows for the simple movement of the sensors as an assembly maintaining the relative position of the sensors (2034, 2037, 2038) to one another on the backplane 2030 even if the backplane is moved. The cylinder and deflection elements, e.g., mirrors, may, but need not be, mounted in a manner so that they will move with the backplane 2030 maintaining the alignment of the optical chains to one another as the backplane 2030 is moved, e.g., up or down or left to right in the camera body 2000. Thus, in some embodiments the backplane 2030 and sensors (2034, 2037, 2038) can be moved in unison, e.g., by applying a force to the backplane 2030 to induce motion as may be desired. In some embodiments, the backplane 2032 is a moveable plate. In some such embodiments, the plate is arranged parallel to the sensor plane 2039.

In one embodiment, motion sensors 2040 are included in the camera device 2000. The motion sensors 2040 may be accelerometers and/or gyroscopes used to detect motion along one or more axis of the camera. In one particular embodiment a shake compensation module 2042 is included in the camera device 2000. The shake compensation module 2042 receives output from the motion sensors 2040 and detects camera movement, e.g., movement indicative of unintentional shaking as is common in the case of hand held cameras. The shake compensation control module 2042 is coupled to a horizontal actuator 2032 and a vertical actuator 2036 which are in contact with the backplane 2030 which may be a circuit board. In some embodiments, the vertical actuator 2036 and horizontal actuator 2032 are included as part of a two axis positioning module 2031. In some such embodiments, the shake compensation control module 2042 is a control module for controlling the two axis positioning module 2031 as a function of camera movement. The vertical actuator 2036 is shown in dashed lines since it is positioned below backplane 2030 and would not be visible from the top. The vertical actuator 2036 can be used to move the backplane 2030, e.g. circuit board, up or down while actuator 2032 can be used to move the backplane 2030 left or right. In at least one embodiment backplane 2030 is mounted in a manner that allows motion left and right, up and down, but which maintains its parallel relationship to the input plane 2012. In some embodiments backplane 2030 is mounted in a slot which is part of the housing of the camera device 2000. The actuators 2032, 3036 may be motorized or implemented using elements which expand or contract when a voltage is supplied. The shake compensation control module 2042 controls the supply of power and/or control signals to actuators 2032, 2036 which induces motion of the backplane 2030 and sensors mounted thereon which is intended to counteract the shaking. The motion of the backplane 2030 is normally not detectable to the holder of the camera but can reduce the distorting in the captured images induced by shaking of the camera housing in which the various elements of the camera are mounted. The lenses and/or openings 2002, 2004, 2006 may not distort or focus the incoming light and may remain fixed while one or more of the other elements of the optical chains move, e.g., to compensate for shaking and/or changes the lenses on the cylinder or drum 2020 through which light will pass.

The FIG. 20 embodiment is particular well suited for embodiments where it is desirable from a manufacturing standpoint and/or shake compensation standpoint to mount the sensors 2034, 2037, . . . , 2038 on backplanes such as printed circuit boards or other relatively flat mounting devices whether they be out of metal, plastic, another material or a combination of materials. In various embodiments, shake compensation control module 2042 is an image stabilization module for determining the amount of movement of the backplane 2030, e.g., a moveable plate, to perform an image stabilization operation to compensate for camera movement.

It may be observed that the light passing through a first optical chain module, e.g., optical chain module 1, in the plurality of optical chain modules (optical chain module 1, optical chain module 2, . . . , optical chain module Z), crosses a light path of another optical chain module (optical chain module Z), when the light passing through the first optical chain module travels from the first deflection element 2022 to the second deflection element 2024 of the first optical chain module. In various embodiments, at least one of the first and second deflection elements is a prism. In various embodiments, light beams passing through different optical chains cross each other when traveling between first and second deflector elements of their respective optical chain modules.

It should be appreciated that the camera device 2000, as well as the camera device 2100 shown in FIG. 21 may include the elements of the camera device 100 shown in FIG. 1A in addition to those shown in FIGS. 20 and 21 but that such elements are omitted to facilitate an understanding of the elements and configuration which is explained using FIGS. 20 and 21.

FIG. 21 illustrates an additional exemplary camera device 2100 in which mirrors (2122, 2124), (2128, 2126) and/or other light redirecting elements are used to alter the path of light in the optical chains so that the input light input lenses and/or opens can be arranged in one or more planes at the front of the camera where the lens and/or openings through which light enters the optical chains are also located. Elements in FIG. 21 which are the same or similar the elements of FIG. 20 are numbered using similar numbers but starting with the first two digits 21 instead of 20. Such similar elements will not be described again expect to point out some of the differences between the FIG. 21 and FIG. 20 configurations.

One of the important differences between the devices 2100 and 2000 is that in the camera device 2100 both the sensors 2134, 2138 and external lenses/openings of the optical chains are located in the front of the camera. This is made possible by having the second mirror 2124 or 2126 direct light to the front of the camera rather than the back of the camera. In the FIG. 21 embodiment the input plane and the sensor plane may be the same plane or positioned in close proximity to each other. As in the case of the FIG. 20 embodiment vertical and horizontal actuators 2132, 2136 may be provided and used to mechanically compensate for detected camera shaking.

The FIG. 21 embodiment may be desirable where a manufacturer may want to combine the input plane assembly and sensor plane assembly into a single unit as part of the manufacturing processor prior to combining it with the cylinder/lens assembly 2120.

Numerous variations on the designs shown in FIGS. 20 and 21 are possible. Significantly, the methods and apparatus of the present invention allow for sensors to be arranged parallel to or on any internal wall of a camera device while still allowing for a camera device to include multiple optical chains in a relatively thin camera. By configuring the sensors parallel to the front or rear walls of the camera rather than the side walls, the sensors and/or lens can be spread out and occupy a greater surface area than might be possible if the camera sensors were restricted to the sidewalls or some other arrangement.

Notably many of the embodiments are well suited for allowing a LCD or other display to be placed at the back of the camera facing out without the display panel significantly interfering with the overall length of the individual optical chain modules included in the camera.

While the invention has been explained using convex lenses in many of the diagrams, it should be appreciated that any of a wide variety of different types of lenses may be used in the optical chain modules including, e.g., convex, concave, and meniscus lenses. In addition, while lenses and filters have been described as separate elements, lenses and filters may be combined and used. For example, a color lens may, and in some embodiments is, used to both filter light and alter the lights path. Furthermore, while many of the embodiments have been described with a color filter preceding the image sensor of an optical chain or as using an image sensor with an integrated color filter, e.g., a Bayer pattern filter, it should be appreciated that use of color filters and/or sensors with color filters is not required and in some embodiments one or more optical chain modules are used which do not include a color filter and also do not use a sensor with a color filter. Thus, in some embodiments one or more optical chain modules which sense a wide spectrum of color light are used. Such optical chain modules are particularly well suited for generating black and white images.

In various embodiments image processing is used to simulate a wide variety of user selectable lens bokehs or blurs in the combined image with regard to image portions which are out of focus. Thus, while multiple lenses are used to capture the light used to generate a combined image, the image quality is not limited to that of an individual one of the lenses and a variety of bokehs can be achieved depending on the particular bokeh desired for the combined image being generated. In some embodiments, multiple combined images with different simulated bokehs are generated using post image capture processing with the user being provided the opportunity to save one or more of the generated combined images for subsequent viewing and/or printing. Thus, in at least some embodiments a physical result, e.g., a printed version of one or more combined images is produced. In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

While different optical chain modules are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amounts of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules. The camera devices of the present invention supports multiple modes of operation with switching between panoramic mode in which different areas are captured, e.g., using multiple lenses per area, and a normal mode in which multiple lens pointed same direction are used to capture the same scene. Different exposure modes and filter modes may also be supported and switched between, e.g., based on user input.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images may be and sometimes are displayed on the camera device or sent to a printer for printing as a photo or permanent document which can be maintained in a file as part of a personal or business record.

Cameras implemented in some embodiments have optical chains which do not extend out beyond the front of the camera during use and which are implemented as portable handheld cameras or devices including cameras. Such devices may and in some embodiments do have a relatively flat front with the outermost lens or clear optical chain covering being fixed. However, in other embodiments lenses and/or other elements of an optical chain may, and sometimes do, extend beyond the face of the camera device.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed:

1. A portable camera apparatus, comprising:
   a plurality of at least three optical chain modules, each optical chain module in said plurality including a lens, a plurality of deflection elements, and a sensor, said plurality of deflection elements including at least a first deflection element and a second deflection element, the sensor of each optical chain module being mounted in a sensor plane, the sensor plane of different optical chain modules being parallel to one another, said plurality of optical chain modules including a first optical chain including first and second light redirection elements and a second optical chain including third and fourth light redirection elements, a first optical path extending between said first and second light redirection elements crossing a second optical path extending between said third and fourth light redirection elements.

2. The portable camera apparatus of claim 1, wherein the first optical path crosses the second optical path in a center portion of said portable camera apparatus around which light enters different optical chains.

3. The portable camera apparatus of claim 1, wherein the sensors of the different optical chain modules are mounted on a movable board, positioned at the front of the portable camera apparatus, through which light passes to enter the plurality of optical chain modules.

4. The portable camera apparatus of claim 3, wherein said moveable board is a circuit board which serves as an input plane and a sensor plane.

5. The portable camera apparatus of claim 1, further comprising:
   a moveable plate on which sensors of different optical chain modules are mounted;
   a two axis positioning module coupled to said movable plate; and
   a control module for controlling said two axis position module as a function of camera movement.

6. The portable camera apparatus of claim 5, wherein said control module is an image stabilization module for determine the amount of movement of said movable plate to perform an image stabilization operation to compensate for camera movement.

7. The portable camera apparatus of claim 1, wherein at least one of the first and second deflection elements is a prism.

8. The portable camera apparatus of claim 1, wherein light beams passing though different optical chain modules cross each other when traveling between the first and second deflection elements of their respective optical chain modules.

9. The portable camera apparatus of claim 1, further comprising:
- a cylinder located in a center portion of said portable camera apparatus on which at least one lens is mounted; and
- wherein the first optical path and the second optical path extend through said cylinder and cross inside said cylinder.

10. A portable camera apparatus, comprising:
- a plurality of at least three optical chain modules, each optical chain module in said plurality including a lens, a plurality of deflection elements, and a sensor, said plurality of deflection elements including at least a first deflection element and a second deflection element, the sensor of each optical chain module being mounted in a sensor plane, the sensor plane of different optical chains being parallel to one another; and
- wherein the light passing through a first optical chain module in said plurality of optical chain modules crosses a light path of another optical chain module when the light passing through the first optical chain module travels from the first deflection element to the second deflection element of the first optical chain module.

11. A portable camera apparatus, comprising:
- a plurality of optical chain modules, each optical chain module in said plurality including a lens, a plurality of deflection elements, and a sensor, said plurality of deflection elements including at least a first deflection element and a second deflection element, the sensor of each optical chain module being mounted in a sensor plane, the sensor plane of different optical chain modules being parallel to one another;
- wherein the light passing through a first optical chain module in said plurality of optical chain modules crosses a light path of another optical chain module when the light passing though the first optical chain module travels from the first deflection element to the second deflection element of the first optical chain module; and
- wherein light beams passing though different optical chain modules cross each other when traveling between the first and second deflection elements of their respective optical chain modules.

12. The portable camera apparatus of claim 11, further comprising an additional optical chain module which includes an image deflection element configured to change the direction of optical rays passing along an optical axis of a lens by substantially 90 degrees to direct said optical rays passing along said optical axis onto the sensor of the optical chain in which said deflection element and said lens are located.

* * * * *